(12) United States Patent
Donovan

(10) Patent No.: US 7,920,749 B1
(45) Date of Patent: Apr. 5, 2011

(54) MODIFIED HIGH DYNAMIC RANGE COLOR DECOMPRESSION

(75) Inventor: Walter E. Donovan, Saratoga, CA (US)

(73) Assignee: NVIDIA Corporation, Santa Clara, CA (US)

( * ) Notice: Subject to any disclaimer, the term of this patent is extended or adjusted under 35 U.S.C. 154(b) by 869 days.

(21) Appl. No.: 11/856,550

(22) Filed: Sep. 17, 2007

Related U.S. Application Data

(63) Continuation-in-part of application No. 11/614,039, filed on Dec. 20, 2006, now Pat. No. 7,742,646.

(51) Int. Cl.
*G06K 9/36* (2006.01)
*G06K 9/46* (2006.01)

(52) U.S. Cl. ........................................................ 382/233

(58) Field of Classification Search ........................ None
See application file for complete search history.

(56) References Cited

U.S. PATENT DOCUMENTS

| | | | |
|---|---|---|---|
| 4,626,829 A | 12/1986 | Hauck | |
| 4,890,249 A | 12/1989 | Yen | |
| 4,893,187 A | 1/1990 | Tsujimoto et al. | |
| 5,293,251 A * | 3/1994 | Corcoran et al. | 358/426.14 |
| 6,771,822 B1 * | 8/2004 | Brackett | 382/232 |
| 6,895,052 B2 | 5/2005 | Hanamura et al. | |
| 6,940,996 B2 * | 9/2005 | Kondo et al. | 382/100 |
| 7,095,783 B1 | 8/2006 | Sotheran et al. | |
| 7,477,795 B2 * | 1/2009 | Hiromitsu et al. | 382/243 |
| 7,742,646 B1 * | 6/2010 | Donovan | 382/232 |
| 2008/0002895 A1 | 1/2008 | Flavell et al. | |
| 2008/0055331 A1 | 3/2008 | Lourcha et al. | |

OTHER PUBLICATIONS

Notice of Allowance, U.S. Appl. No. 11/614,039, dated Feb. 4, 2010.
Munkberg et al., "High Dynamic Range Texture Compression for Graphics Hardware," Association for Computing Machinery, Inc. pp. 698-706, 2006.
Ström et al., iPACKMAN: "High-Quality, Low-Complexity Texture Compression for Mobile Phones," ACM Press, pp. 63-70, Graphics Hardware, 2005.
Roimela et al., "High Dynamic Range Texture Compression," ACM Transactions on Graphics, vol. 25, No. 3, pp. 698-706, Jul. 2006.

\* cited by examiner

*Primary Examiner* — Yuzhen Ge
(74) *Attorney, Agent, or Firm* — Patterson & Sheridan, LLP

(57) ABSTRACT

Systems and methods for representing high dynamic range data in compressed formats with a fixed size block allow high dynamic range data to be stored in less memory. The compressed formats use 8 bits per pixel. A first compressed format includes two endpoint values and compressed indices for the pixels in the block. A second compressed format includes four endpoint values, a partition index that specifies a mask for each pair of the four endpoint values, and compressed indices for the pixels in the block. The two formats may be used for various blocks within a single compressed image and mode bits are included to distinguish between the two formats. Furthermore, each endpoint value may be encoded using an endpoint compression mode that is also specified by the mode bits. Compressed high dynamic range values represented in either format may be efficiently decompressed in hardware.

17 Claims, 13 Drawing Sheets

MODIFIED HIGH DYNAMIC RANGE COLOR DECOMPRESSION

CROSS-REFERENCE TO RELATED APPLICATIONS

This application is a continuation-in-part of U.S. patent application Ser. No. 11/614,039, filed Dec. 20, 2006 now U.S. Pat. No. 7,742,646, which is herein incorporated by reference.

BACKGROUND OF THE INVENTION

1. Field of the Invention

Embodiments of the present invention generally relate to data decompression and, more specifically, to decompression of high dynamic range pixel data.

2. Description of the Related Art

Conventional compression techniques and formats, such as the DXTC compressed texture format used by DirectX 8, may be used to compress unsigned data including 3 channels represented by a 16 bit value, such as 565 format RGB data. These compression and decompression techniques and formats do not directly support high dynamic range data that is typically 48 or more bits per pixel (bpp). High dynamic range data is increasingly used as texture maps used to produce high quality images with luminance values that span many orders of magnitude.

Accordingly, there is a need for data compression of high dynamic range values in order to store the values in a compact format that reduces the memory bandwidth needed to read the high dynamic range data. Furthermore, it is desirable to be able to decompress the compressed high dynamic range values in hardware in order to process the high dynamic range values as texture data.

SUMMARY OF THE INVENTION

The current invention involves new systems and methods for decompressing high dynamic range data that is represented in compressed formats with a fixed size block based on a compression size of 8 bits per pixel (bpp). A first compressed format includes two compressed endpoint values and an index for each pixel in the block. A second compressed format includes four compressed endpoint values, a partition index that specifies a mask for each pair of the four compressed endpoint values, and an index for each pixel in the block. In an alternate embodiment of the current invention, the first compressed format includes two compressed endpoint values and compressed indices for the pixels in the block. The second compressed format includes four compressed endpoint values, the partition index, and compressed indices for the pixels in the block. The two formats of either embodiment may be used for various blocks within a single compressed image, therefore mode bits are included to distinguish between the two formats. Furthermore, each compressed endpoint value is encoded using an endpoint compression mode that is also specified by the mode bits.

Various embodiments of a method of the invention for decompressing high dynamic range values represented in a compressed format, include determining an endpoint compression mode that is specified by the compressed format, extracting a first decompressed endpoint and one or more remaining compressed endpoints from a compressed endpoint field of the compressed format, and extracting compressed indices from the compressed format. The method computes a second decompressed endpoint when the endpoint compression mode indicates that the one or more remaining compressed endpoints are encoded as differences or computes a third decompressed endpoint and a fourth decompressed endpoint when the endpoint compression mode indicates that dual endpoint pair compression is used to encode the high dynamic range data. The method decompresses the compressed indices to produce decompressed indices that include an index for each pixel in a fixed sized block and computes a decompressed high dynamic range value for each channel of each pixel in the fixed size block using the first decompressed endpoint and the second decompressed endpoint or the first decompressed endpoint, the second decompressed endpoint, the third decompressed endpoint, and the fourth decompressed endpoint, and the decompressed indices.

Various embodiments of the invention include a system for decompressing high dynamic range data represented in a compressed format. The system includes an endpoint computation unit, an index computation unit, and a pixel computation unit. The endpoint computation unit is configured to determine an endpoint compression mode that is specified by the compressed format, extract a first decompressed endpoint from a compressed endpoint field of the compressed format, extract one or more remaining compressed endpoints from the compressed endpoint field of the compressed format, compute a second decompressed endpoint when the endpoint compression mode indicates that the one or more remaining compressed endpoints are encoded as differences, and compute a third decompressed endpoint and a fourth decompressed endpoint when the endpoint compression mode indicates that dual endpoint pair compression is used to encode the high dynamic range data. The index computation unit is configured to extract compressed indices from the compressed format and decompress the compressed indices to produce decompressed indices that include an index for each pixel in a fixed sized block. The pixel value computation unit is coupled to the endpoint computation unit and the index computation unit, and configured to compute a decompressed high dynamic range value for each channel of each pixel in a fixed size block using the first decompressed endpoint and the second decompressed endpoint or the first decompressed endpoint, the second decompressed endpoint, the third decompressed endpoint, and the fourth decompressed endpoint and the decompressed indices.

Various embodiments of a compressed data format of the invention representing high dynamic range data are embodied in a computer-readable medium. The compressed data format includes mode bits in a first field, a compressed endpoint field, and an index field of variable length. The mode bits indicate whether the compressed data format specifies a single endpoint pair or a dual endpoint pair and an endpoint compression format that is used to encode a first endpoint and one or more remaining endpoints. The compressed endpoint field includes two compressed endpoints or four compressed endpoints. The index field includes compressed pixel indices each correspond to a single pixel within a fixed size block of high dynamic range data, wherein each compressed index is used to compute a decompressed high dynamic range value for each pixel in the fixed size block.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

High dynamic range data is represented in compressed formats with a compression size of 8 bpp. 4×4 pixel blocks are compressed into 128 bits that include two or four compressed endpoint values with three channels and an index for each pixel in the block. Other embodiments of the present invention may include fewer or more pixels in an N×M dimension block, where N and M are each integers. Each pixel may include up to three channels of data, e.g., red, green, blue, alpha, depth, or the like. Because a fixed size block of data is compressed into a fixed length format, it is possible to determine the location of each particular block of data, permitting random access of the compressed data.

Furthermore, each endpoint value may be encoded using a different endpoint compression mode that is specified by mode bits. Different blocks within a single image may use a different endpoint compression format (specified by the mode bits), varying the number of compressed endpoint values (two or four), the number of bits stored for each endpoint (and each channel of the endpoints), and storing the compressed endpoints as differences. When four endpoint values are used a partition index specifies a mask for each pair of the four endpoint values to provide higher quality compression for blocks with more pixel variation that can be represented using a single linear interpolation computation. The compression scheme has a compression size of 8 bpp and, when viewed by tone mapping (a technique for displaying high dynamic range images on displays with limited dynamic range that is known to those skilled in the art), the compressed images are visually nearly indistinguishable from the tone-mapped 48 bpp original data.

Figure 1A:
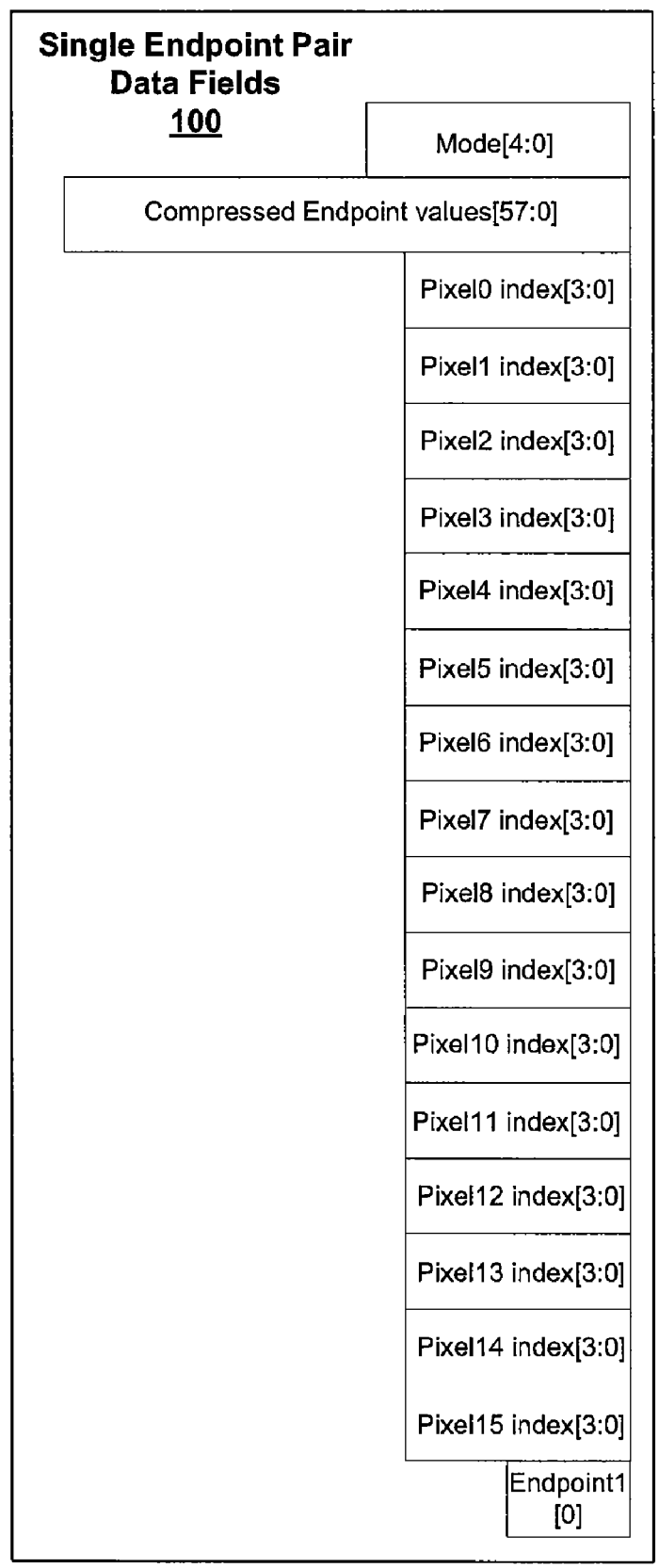
FIG. 1A illustrates data fields of a single endpoint pair compression format representing a fixed size block of pixels in accordance with one or more aspects of the present invention.

FIG. 1A illustrates data fields of a single endpoint pair compression format representing a fixed size block of pixels, in accordance with one or more aspects of the present invention. Single endpoint pair data fields 100 include 128 bits of data (16 bytes) representing compressed high dynamic pixel data of an N×M pixel block. The compression format includes a single endpoint pair, compressed endpoint values [57:0], representing two endpoint values, Endpoint0 and Endpoint1, and sixteen 4 bit indices, one index for each pixel. Each endpoint value includes three channels, e.g., RGB. In other embodiments of the present invention, fewer than three channels may be represented by each endpoint value. Furthermore, in other embodiments of the present invention, the ordering of the fields in single endpoint pair data fields 100 may be modified.

The least significant bit (lsb) of Endpoint1 is stored in a field of single endpoint pair data fields 100. The lsb of Endpoint0 is encoded by the ordering of Endpoint0 and Endpoint1, as described in conjunction with FIG. 1B. The mode bits, mode[4:0] specify the endpoint compression mode that is used to represent Endpoint0 and Endpoint1 that are encoded in endpoint values[57:0] and Endpoint1[0].

TABLE 1 illustrates the endpoint compression formats that are specified by the mode bits, for one embodiment of the present invention. The number of bits in the endpoint values field of single endpoint pair data fields 100 for each channel of Endpoint0 and Endpoint1 is shown in TABLE 1. Each mode specifies a different number of bits for the channels as shown for compressed Endpoint0 and compressed Endpoint1. Note that when the difference encoding flag is 1, the values for compressed Endpoint1 are actually signed values and thus need to be sign-extended before being added to the corresponding values for compressed Endpoint0.

TABLE 1

| Mode | Difference encoding | Compressed Endpoint0 | | | Compressed Endpoint1 | | |
| --- | --- | --- | --- | --- | --- | --- | --- |
| | | Red | Green | Blue | Red | Green | Blue |
| 0 | 0 | 10 | 10 | 10 | 10 | 10 | 10 |
| 1 | 1 | 11 | 11 | 11 | 9 | 9 | 9 |
| 2 | 1 | 12 | 12 | 12 | 8 | 8 | 8 |
| 3 | 1 | 15 | 15 | 15 | 5 | 5 | 5 |

Note that only two of the mode bits are needed to specify the four different endpoint compression formats. The additional bits are used when the dual endpoint pair compression format is used, as described in conjunction with FIGS. 2A, 2B, and 3. The channel (red, green, and blue) values for Endpoint0 are directly specified by compressed Endpoint0. The difference encoding flag indicates whether or not the compressed Endpoint1 channel values are directly specified or whether channel differences are specified. Channel differences are sign extended and then summed with the corresponding channel values of Endpoint0 to produce the channel values for Endpoint1.

Figure 1B:
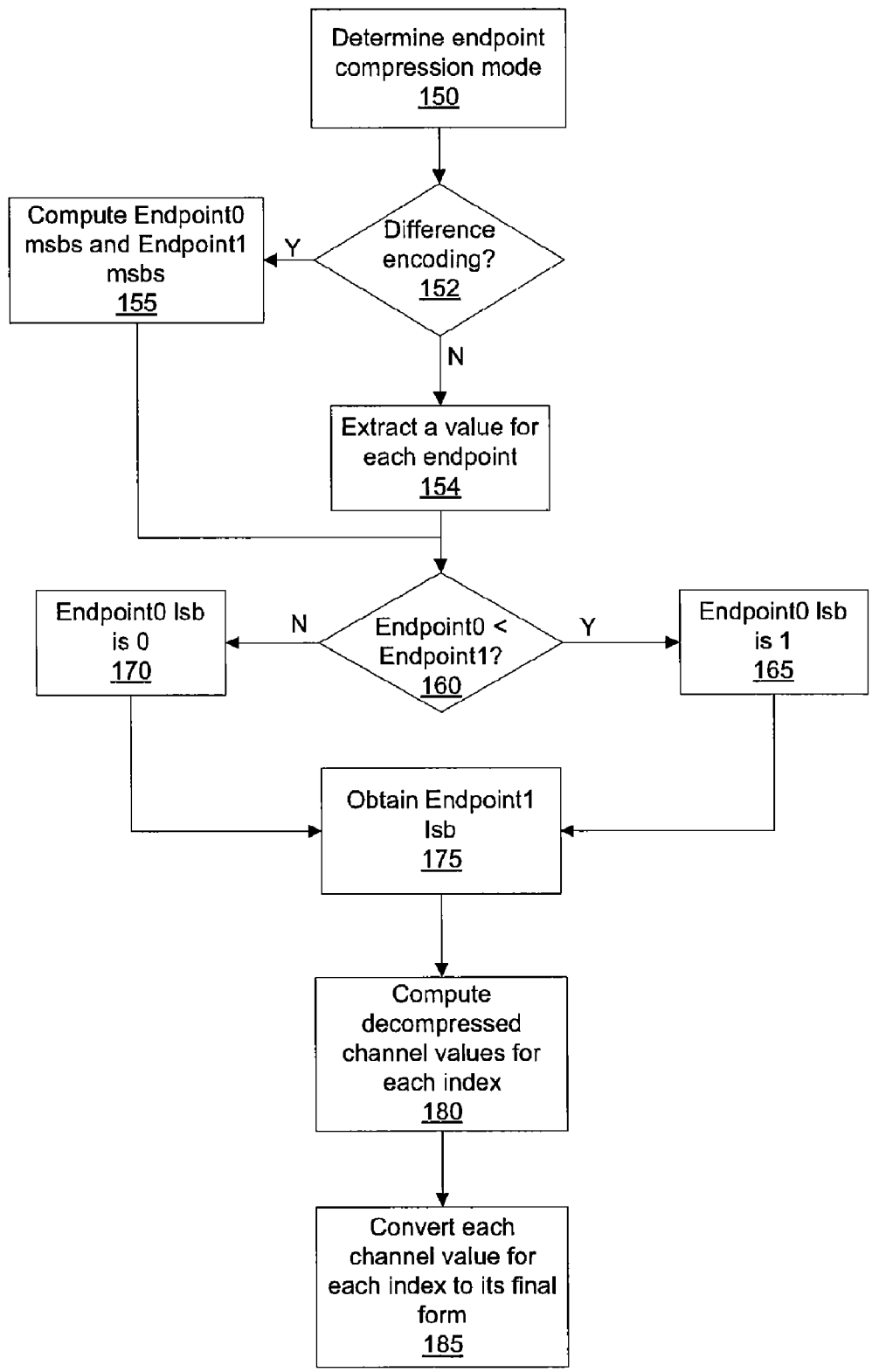
FIG. 1B illustrates a flow diagram of an exemplary method of decompressing data represented in the format shown in FIG. 1A in accordance with one or more aspects of the present invention.

FIG. 1B illustrates a flow diagram of an exemplary method of decompressing data represented by single endpoint pair data fields 100 as shown in FIG. 1A, in accordance with one or more aspects of the present invention. In step 150 the method determines the endpoint compression mode that is specified by the mode bits. In step 152 the method determines if the endpoint pair is encoded using difference encoding. Difference encoding is not specified when the mode is 0 (shown in TABLE 1). Specifically, when the mode is 0, the msbs of Endpoint0 and Endpoint1 are each 29 bit values that are directly specified by compressed endpoint values.

If, in step 152 the method determines that difference encoding is not specified by the endpoint compression mode, then in step 154 the method extracts values for Endpoint0 and Endpoint1. Otherwise, in step 155 the method computes the most significant bits (msb) of Endpoint0 and Endpoint1. When the difference encoding modes are used, the msbs of Endpoint0 are directly specified and the msbs of Endpoint1 are computed by sign extending the compressed endpoint1 value (difference) for each channel and summing it with the corresponding channel of Endpoint0.

The lsb of Endpoint0 is encoded in the ordering of Endpoint0 and Endpoint1. As known by those skilled in the art, the ordering of two endpoints may be swapped for linear interpolation computations and the interpolation indices are modified accordingly to produce the same results as when the endpoints are not swapped. In step 160 the method determines if Endpoint0 is less than Endpoint1, and, if so, then in step 165 the method sets the lsb of Endpoint0 (Endpoint0[0]) to a value of 1. Otherwise, in step 170 the method sets the lsb of Endpoint0 to a value of 0.

In step 175 the method obtains the lsb of Endpoint1 from the Endpoint1[0] field in single endpoint pair data fields 100. Once the msbs and lsbs are combined for each endpoint, each of the six channel values for Endpoint0 and Endpoint1 are 10 to 15 bit signed or unsigned values. The six channel values are unquantized, using techniques known to those skilled in the art, to produce six 17 bit signed channel values as decompressed Endpoint0 and Endpoint1. Endpoint0 and Endpoint1 are then used to compute high dynamic range values for each pixel of a block. In step 180 the method computes a decompressed value for each pixel using the pixel indices provided in single endpoint pair data fields 100. Note that during compression, the pixel indices are computed based on the ordering of Endpoint° and Endpoint1 that is encoded in single endpoint pair data fields 100. Specifically, the channel values are computed using linear interpolation, as shown in equation 1:

$$Pixel_c = Endpoint1_c(\text{index}) + Endpoint0_c(N-\text{index})/N, \quad (\text{eq. 1})$$

where c corresponds to each channel, e.g., red, green, blue, or the like and N is 15 for a single endpoint pair and 7 for dual endpoint pairs.

In step 185 the method converts the channel values computed in step 180 to a final format based on the texture format that is specified, e.g., signed fp16 (16 bit floating point), unsigned fp16, signed 16 bit integer, and unsigned 16 bit integer. Specifically, to convert a channel value to an unsigned fp16 format does not require any computation. The channel value is simply interpreted as an fp16 value rather than as an integer. For example, the bit pattern 0x7bff is interpreted as a fp16 format number with a value of 65504.0. The code shown in TABLE 2 may be used to perform the conversion. In some embodiments of the present invention, circuitry is configured to perform the conversion represented by the code shown in TABLE 2. Note that each channel value (channel_value) is a 17 bit signed integer with a limited range (which is 0 . . . 7fff for unsigned fp16, −7fff . . . 7fff for signed fp16, 0.ffff for unsigned int, and −0x8000.7fff for signed int.

Figure 2A:
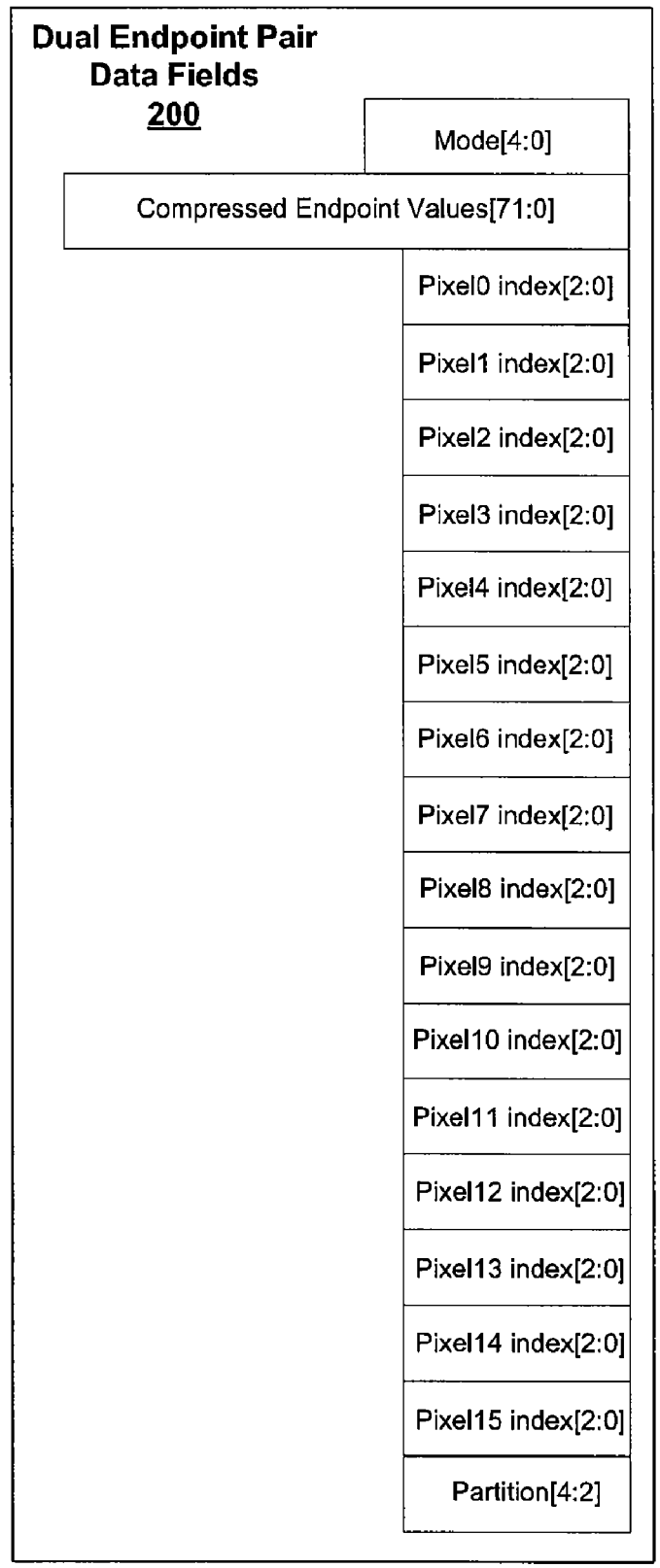
FIG. 2A illustrates data fields of a dual endpoint pair compression format representing a fixed size block of pixels in accordance with one or more aspects of the present invention.

TABLE 2 if (format is unsigned fp16)
   result.setBits(channel_value)  // copy as is.
else if (format is signed fp16) {
   if (channel_value < 0)
      // set sign bit, copy the negation of the value as is
      result.setBits(0x8000 | (−channel_value))
   else
      result.setBits (channel_value)  // copy as is
} else if (format is signed 16 bit int)
   result.setBits(channel_value)  // copy as is
else if (format is unsigned 16 bit int)
   result.setBits(channel_value)  // copy as is FIG. 2A illustrates dual endpoint pair data fields 200 of another compression format representing a fixed size block of pixels, in accordance with one or more aspects of the present invention. Like single endpoint pair data fields 100, dual endpoint pair data fields 200 include 128 bits of data representing compressed high dynamic pixel data of an N×M pixel block. The dual endpoint pair compression format includes two endpoint pairs, compressed endpoint values [71:0], representing four endpoint values, Endpoint0, Endpoint1, Endpoint2, and Endpoint3, and sixteen 3 bit pixel indices, one index for each pixel. Since two endpoint pairs are used to compress each block instead of a single endpoint pair, each pixel index is 3 bits instead of 4. Therefore, 8 different values may be encoded for each endpoint pair instead of 16 different values that may be encoded when the single endpoint compression format is used. Each endpoint value includes three channels, so twelve 6 to 11 bit channel values are available (as shown in TABLE 3). In other embodiments of the present invention, fewer than three channels may be represented by each endpoint value. Furthermore, in other embodiments of the present invention, the ordering of the fields in dual endpoint pair data fields 200 may be modified.

In addition to specifying whether the endpoint compression mode is single or dual, the mode bits, Mode[4:0] specify the endpoint compression mode that is used to represent Endpoint0, Endpoint1, Endpoint2, and Endpoint3 that are encoded in compressed endpoint values[71:0]. A partition mask is specified by a partition index provided in the Partition[4:2] field of dual endpoint pair data fields 200. Two additional bits (Partition[1:0]) of the partition field, Partition[4:2] are encoded by the orderings of Endpoint0 and Endpoint1 and Endpoint2 and Endpoint2, as described in conjunction with FIG. 2B.

TABLE 3 illustrates the endpoint compression formats that are specified by the mode bits, for one embodiment of the present invention. The number of bits in the compressed endpoint values field of dual endpoint pair data fields 200 for each channel of Endpoint0 and the remaining endpoints is shown in TABLE 3. Difference encoding is specified for the modes, except when the mode is 27. Specifically, when the mode is 27, the msbs of the twelve channel values for Endpoint0, Endpoint1, Endpoint2, and Endpoint3 are each 6 bit values that are directly specified by compressed endpoint values.

TABLE 3

| Mode | Compressed Endpoint0 | | | Compressed Endpoints1,2,3 | | |
|---|---|---|---|---|---|---|
| | Red | Green | Blue | Red | Green | Blue |
| 8 | 11 | 11 | 11 | 5 | 4 | 4 |
| 9 | 11 | 11 | 11 | 4 | 5 | 4 |
| 10 | 11 | 11 | 11 | 4 | 4 | 5 |
| 11 | 10 | 10 | 10 | 5 | 5 | 4 |
| 12 | 10 | 10 | 10 | 5 | 4 | 5 |
| 13 | 10 | 10 | 10 | 4 | 5 | 5 |
| 14 | 9 | 9 | 9 | 5 | 5 | 5 |
| 15 | 8 | 8 | 8 | 6 | 5 | 5 |
| 16 | 8 | 8 | 8 | 5 | 6 | 5 |
| 17 | 8 | 8 | 8 | 5 | 5 | 6 |
| 18 | 8 | 8 | 8 | 6 | 6 | 4 |
| 19 | 8 | 8 | 8 | 6 | 4 | 6 |
| 20 | 8 | 8 | 8 | 4 | 6 | 6 |
| 21 | 7 | 7 | 7 | 7 | 7 | 3 |
| 22 | 7 | 7 | 7 | 7 | 3 | 7 |
| 23 | 7 | 7 | 7 | 3 | 7 | 7 |
| 24 | 7 | 7 | 7 | 7 | 5 | 5 |
| 25 | 7 | 7 | 7 | 5 | 7 | 5 |
| 26 | 7 | 7 | 7 | 5 | 5 | 7 |
| 27 | 6 | 6 | 6 | 6 | 6 | 6 |

The channel (red, green, and blue) values for Endpoint0 are directly specified by compressed Endpoint0. Channel differences are specified for the remaining three compressed endpoints (except for mode 27). Channel differences are sign extended and summed with the corresponding channel values of Endpoint0 to produce nine of the twelve channel values. The twelve channel values (including the channel values for Endpoint0) are then unquantized, using techniques known to those skilled in the art, to produce twelve signed 17 bit channel values for Endpoint0, Endpoint1, Endpoint2, and Endpoint3. Note that the twelve channel values for mode 27 are also unquantized to produce twelve signed 17 bit channel values for Endpoint0, Endpoint1, Endpoint2, and Endpoint3.

Partition[4:0] encoded in dual endpoint pair data fields 200 is a partition index that specifies a partition mask that is used to compute pixel values using one pair of endpoints of the dual endpoint pair. The different partition masks for each partition index are shown in TABLE 4. In other embodiments of the present invention different partition masks may be defined by the partition indices.

TABLE 4

| Partition mode[4:0] | Partition mask |
|---|---|
| 0 | 0 0 1 1 |
| | 0 0 1 1 |
| | 0 0 1 1 |
| | 0 0 1 1 |
| 1 | 0 0 0 1 |
| | 0 0 0 1 |
| | 0 0 0 1 |
| | 0 0 0 1 |
| 2 | 0 1 1 1 |
| | 0 1 1 1 |
| | 0 1 1 1 |
| | 0 1 1 1 |
| 3 | 0 0 0 1 |
| | 0 0 1 1 |
| | 0 1 1 1 |
| | 0 1 1 1 |
| 4 | 0 0 0 0 |
| | 0 0 0 1 |
| | 0 0 0 1 |
| | 0 0 1 1 |
| 5 | 0 0 1 1 |
| | 0 1 1 1 |
| | 0 1 1 1 |
| | 1 1 1 1 |
| 6 | 0 0 0 1 |
| | 0 0 1 1 |
| | 0 1 1 1 |
| | 1 1 1 1 |
| 7 | 0 0 0 0 |
| | 0 0 0 1 |
| | 0 0 1 1 |
| | 0 1 1 1 |
| 8 | 0 0 0 0 |
| | 0 0 0 0 |
| | 0 0 0 1 |
| | 0 0 1 1 |
| 9 | 0 0 1 1 |
| | 0 1 1 1 |
| | 1 1 1 1 |
| | 1 1 1 1 |
| 10 | 0 0 0 0 |
| | 0 0 0 1 |
| | 0 1 1 1 |
| | 1 1 1 1 |
| 11 | 0 0 0 0 |
| | 0 0 0 0 |
| | 0 0 0 1 |
| | 0 1 1 1 |
| 12 | 0 0 0 1 |
| | 0 1 1 1 |
| | 1 1 1 1 |
| | 1 1 1 1 |
| 13 | 0 0 0 0 |
| | 0 0 0 0 |
| | 1 1 1 1 |
| | 1 1 1 1 |
| 14 | 0 0 0 0 |
| | 1 1 1 1 |
| | 1 1 1 1 |
| | 1 1 1 1 |
| 15 | 0 0 0 0 |
| | 0 0 0 0 |
| | 0 0 0 0 |
| | 1 1 1 1 |
| 16 | 0 0 0 0 |
| | 1 0 0 0 |
| | 1 1 1 0 |
| | 1 1 1 1 |
| 17 | 1 0 0 0 |
| | 1 1 1 0 |
| | 1 1 1 1 |
| | 1 1 1 1 |
| 18 | 0 0 0 0 |
| | 0 0 0 0 |
| | 1 0 0 0 |
| | 1 1 1 0 |
| 19 | 1 0 0 0 |
| | 1 1 0 0 |
| | 1 1 1 0 |
| | 1 1 1 1 |
| 20 | 1 1 0 0 |
| | 1 1 1 0 |
| | 1 1 1 1 |
| | 1 1 1 1 |
| 21 | 0 0 0 0 |
| | 1 0 0 0 |
| | 1 1 0 0 |
| | 1 1 1 1 |
| 22 | 0 0 0 0 |
| | 0 0 0 0 |
| | 1 0 0 0 |
| | 1 1 0 0 |
| 23 | 1 0 0 0 |
| | 1 1 0 0 |
| | 1 1 0 0 |
| | 1 1 1 0 |

TABLE 4-continued

| Partition mode[4:0] | Partition mask |
|---|---|
| 24 | 1 1 0 0 |
|  | 1 1 1 0 |
|  | 1 1 1 0 |
|  | 1 1 1 1 |
| 25 | 0 0 0 0 |
|  | 1 0 0 0 |
|  | 1 0 0 0 |
|  | 1 1 0 0 |
| 26 | 0 1 1 0 |
|  | 0 1 1 0 |
|  | 0 1 1 0 |
|  | 0 1 1 0 |
| 27 | 0 0 1 1 |
|  | 0 1 1 0 |
|  | 0 1 1 0 |
|  | 1 1 0 0 |
| 28 | 0 0 0 1 |
|  | 0 1 1 1 |
|  | 1 1 1 0 |
|  | 1 0 0 0 |
| 29 | 0 0 0 0 |
|  | 1 1 1 1 |
|  | 1 1 1 1 |
|  | 0 0 0 0 |
| 30 | 1 0 0 0 |
|  | 1 1 1 0 |
|  | 0 1 1 1 |
|  | 0 0 0 1 |
| 31 | 1 1 0 0 |
|  | 0 1 1 0 |
|  | 0 1 1 0 |
|  | 0 0 1 1 |

Figure 2B:
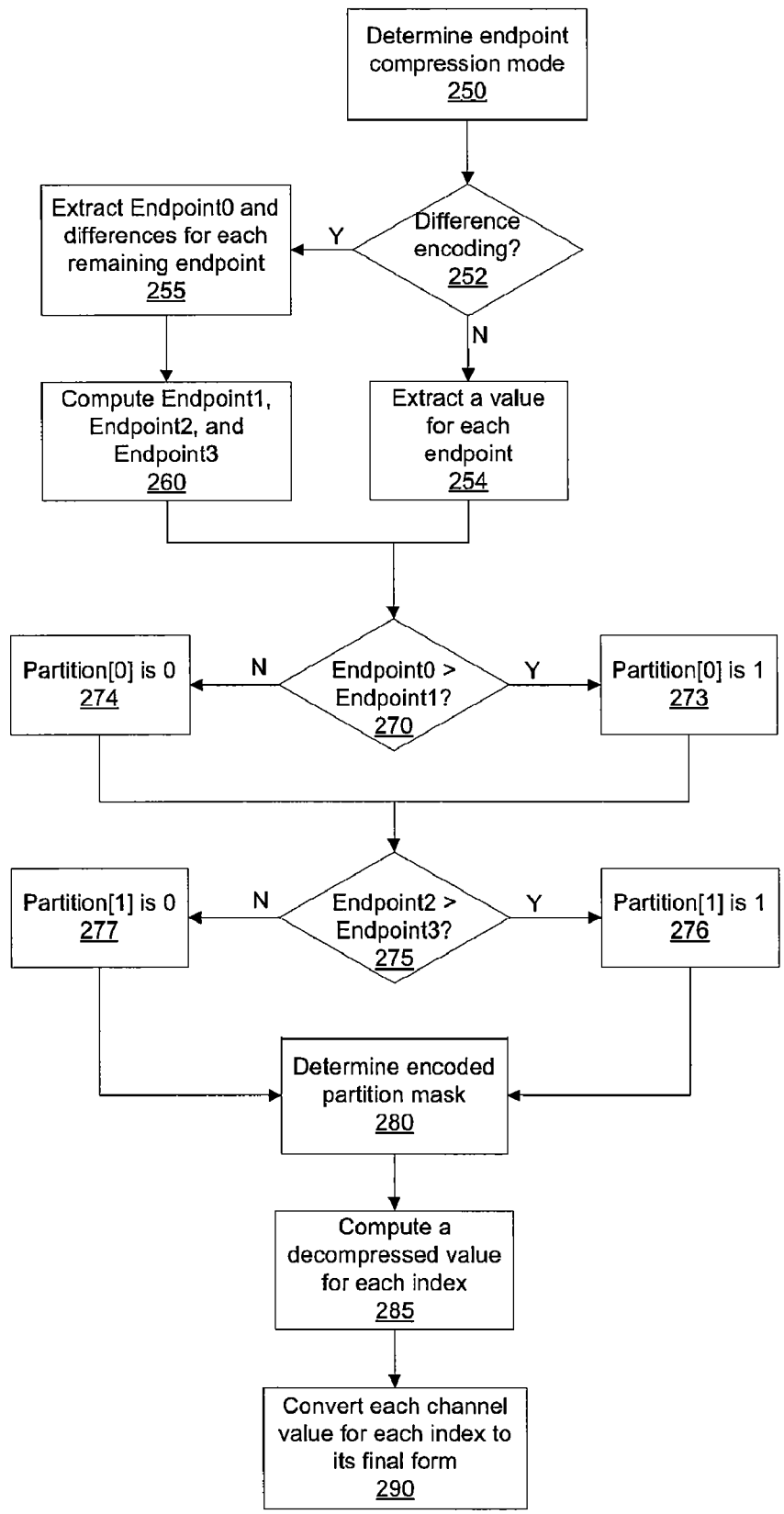
FIG. 2B illustrates a flow diagram of an exemplary method of decompressing data represented in the format shown in FIG. 2A in accordance with one or more aspects of the present invention.

FIG. 2B illustrates a flow diagram of an exemplary method of decompressing data represented in the dual endpoint pair compression format shown in FIG. 2A, in accordance with one or more aspects of the present invention. In step 250 the method determines the endpoint compression mode that is specified by the mode bits. In step 252 the method determines if the endpoint pair is encoded using difference encoding. Difference encoding is not specified when the mode is 27 (shown in TABLE 3). Specifically, when the mode is 27, the msbs of Endpoint0 and Endpoint1 are each 18 bit values that are directly specified by compressed endpoint values.

If, in step 252 the method determines that difference encoding is not specified by the endpoint compression mode, then in step 254 the method extracts values for Endpoint0, Endpoint1, Endpoint2, and Endpoint3 and proceeds to step 270. Otherwise, in step 255 the method extracts Endpoint0 and differences for each remaining endpoint from the compressed endpoint values field. In step 260 the method computes Endpoint1 and Endpoint2 by first sign extending the differences for each channel and summing each sign extended difference with the corresponding channels of Endpoint0 and then unquantizing each channel value, including the channel values for Endpoint0, to produce twelve 17 bit signed values for the endpoints. The method computes Endpoint3 by sign extending the difference for each channel of Endpoint3 and summing each sign extended difference with the corresponding channels of Endpoint2. In other embodiments of the present invention, Endpoint3 is encoded as a difference relative to Endpoint1 instead of a difference relative to Endpoint2.

Two of the partition index bits are encoded in the ordering of the endpoint pairs. Specifically, the ordering of Endpoint0 and Endpoint1 encodes Partition[0] and the ordering of Endpoint2 and Endpoint3 encodes Partition[1]. In step 270 the method determines if Endpoint0 is greater than Endpoint1, and, if so, then in step 273 the method sets Partition[0] to a value of 1. Otherwise, in step 274 the method sets Partition[0] to a value of 0. In step 275 the method determines if Endpoint2 is greater than Endpoint3, and, if so, then in step 276 the method sets Partition[1] to a value of 1. Otherwise, in step 277 the method sets Partition[1] to a value of 0.

In step 280 the method combines Partition[1] and Partition[0] with Partition[4:2] and determines the partition mask that is encoded by Partition[4:0] (see TABLE 4). In step 285 the method computes a decompressed value for each pixel using the pixel indices provided in dual endpoint pair data fields 100. Each index is 3 bits, in order to specify 8 different sample points between a pair of endpoints. Note that during compression, the indices are computed based on the ordering of Endpoint0 and Endpoint1 that is encoded in dual endpoint pair data fields 100. The channel values for each pixel are computed using linear interpolation based on the pixel index, partition mask bit, and one pair of the endpoints. Specifically, the partition mask bit for each pixel is used to select which pair of the dual endpoint pairs to use in the linear interpolation (eq. 1) in order to compute the channel values for the pixel. For example, when the partition mask bit is 0, Endpoint0 and Endpoint 1 are used to compute the channel values and when the partition mask bit is 1, Endpoint1 and Endpoint3 are used to compute the channel values.

In step 290 the method converts the channel values computed in step 285 to a final format based on the texture format that is specified, e.g., signed fp16 (16 bit floating point), unsigned fp16, signed 16 bit integer, and unsigned 16 bit integer, as previously described in conjunction with step 185 of FIG. 1B. The decompressed endpoint pairs (Endpoint0 and 1 and Endpoint2 and 3) may then be used to compute high dynamic range values for each pixel of a block.

Figure 3:
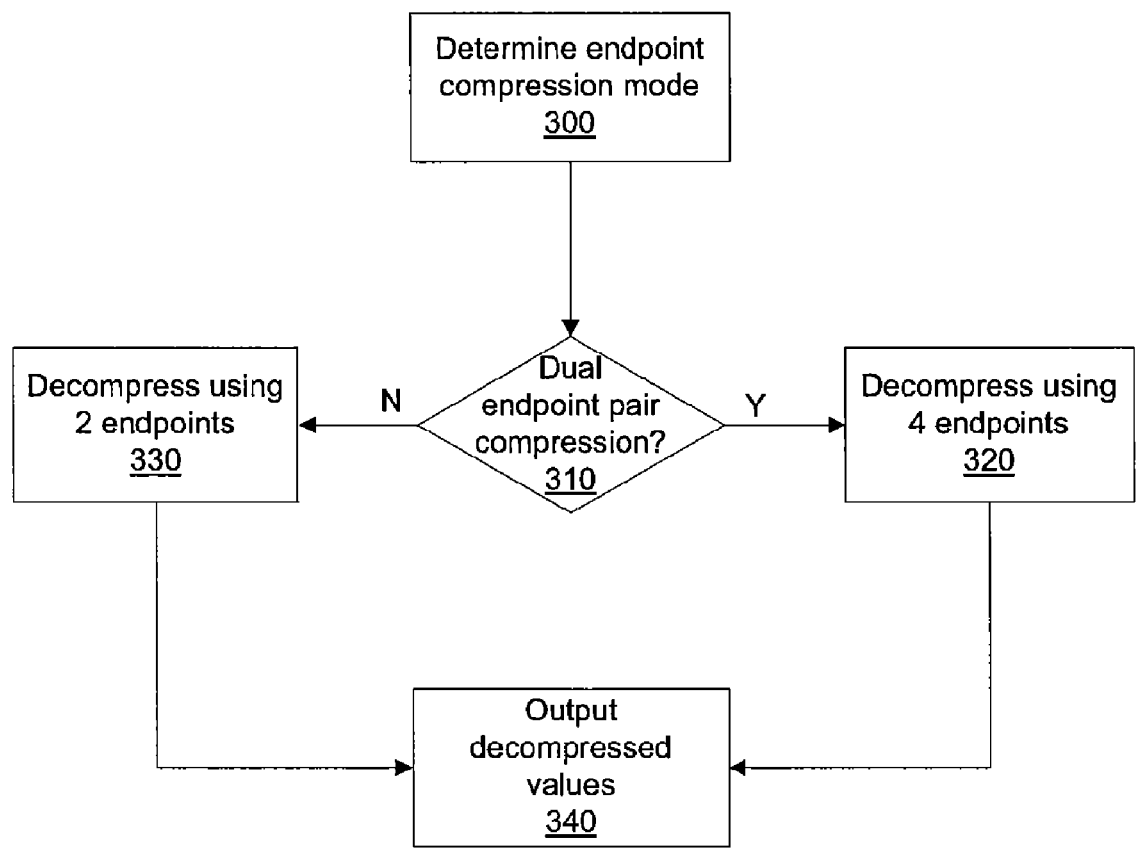
FIG. 3 illustrates a flow diagram of an exemplary method of decompressing data compressed using two or four encoded endpoint values in accordance with one or more aspects of the present invention.

FIG. 3 illustrates a flow diagram of an exemplary method of decompressing data compressed using two or four compressed endpoint values, in accordance with one or more aspects of the present invention. In step 300 the method determines the endpoint compression mode that is specified by the mode bits, Mode[4:0] of FIGS. 1A and 2A. In step 310 the method determines if the mode bits specify dual endpoint pair compression, and, if so, then in step 320 the method decompresses the compressed pixel data by performing steps 250 through 285, as described in conjunction with FIG. 2B. In step 310 the method determines if the mode bits do not specify dual endpoint pair compression, and, if so, then in step 330 the method decompresses the compressed pixel data by performing steps 150 through 185, as described in conjunction with FIG. 1B. In step 340 the decompression is complete and the method outputs the decompressed high dynamic range channel values for each pixel in the block.

Figure 4A:
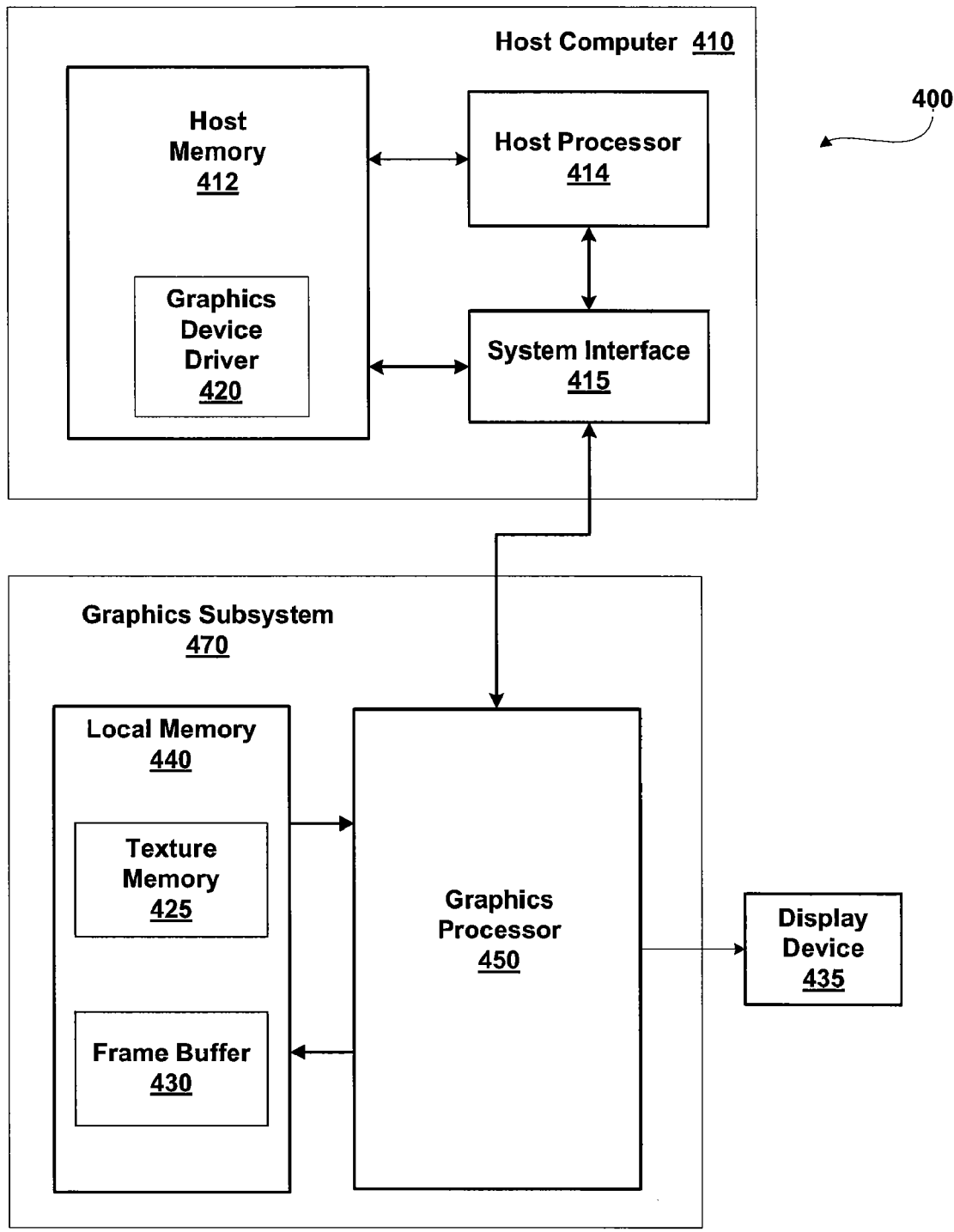
FIG. 4A is a block diagram of a graphics processing system in accordance with one or more aspects of the present invention.

FIG. 4A illustrates one embodiment of a computing system 400 including a host computer 410 and a graphics subsystem 470, in accordance with one embodiment of the present invention. Computing system 400 may be a desktop computer, server, laptop computer, palm-sized computer, tablet computer, game console, cellular telephone, computer based simulator, or the like. Host computer 410 includes host processor 414 that may include a system memory controller to interface directly to host memory 412 or may communicate with host memory 412 through a system interface 415. System interface 415 may be an I/O (input/output) interface or a bridge device including the system memory controller to interface directly to host memory 412.

A graphics device driver 420 is stored in host memory 412 and is configured to interface between applications and a graphics subsystem 470. Graphics device driver 420 translates instructions for execution by graphics processor 450 based on the specific capabilities of graphics processor 450. In some embodiments of the present invention, graphics device driver 420 is configured to compress high dynamic range data into the single endpoint compressed format or the dual endpoint compressed format for use by graphics processor 450. Storing the high dynamic range data in a compressed format reduces the amount of memory needed to store the data and reduces the bandwidth needed to read the data. Graphics device driver 420 may store the compressed high dynamic range data in texture memory 225 for processing by graphics processor 450.

Host computer 410 communicates with graphics subsystem 470 via system interface 415. Data received by graphics processor 450 can be processed by a graphics pipeline within graphics processor 450 or written to a local memory 440. Graphics processor 450 uses graphics memory to store graphics data and program instructions, where graphics data is any data that is input to or output from units within graphics processor 450. Graphics memory can include portions of host memory 412, local memory 440, register files coupled to the components within graphics processor 450, and the like. Graphics processor 450 includes one or more processing units that may each read and/or write graphics memory. In alternate embodiments, host processor 414, graphics processor 450, system interface 415, or any combination thereof, may be integrated into a single processing unit. Further, the functionality of graphics processor 450 may be included in a chip set or in some other type of special purpose processing unit or co-processor.

In a typical implementation graphics processor 450 performs geometry computations, rasterization, pixel texture mapping and shading computations and raster operations. Texture maps, including compressed high dynamic range data are stored in texture memory 225 within local memory 440. The compressed high dynamic range data represented in the single endpoint pair or dual endpoint pair format may be read and decoded by graphics processor 450 for use during the execution of graphics processing programs. Specifically, the compressed high dynamic range data may be used during the processing of geometry, vertex, or pixel data.

When the data received by graphics subsystem 470, including decompressed high dynamic range data, has been completely processed by graphics processor 450, processed graphics data is output to a frame buffer 430 within local memory 440. In some embodiments of the present invention, graphics processor 450 is optionally configured to deliver data to a display device 435, network, electronic control system, other computing system 400, other graphics subsystem 470, or the like. Alternatively, data is output to a film recording device or written to a peripheral device, e.g., disk drive, tape, compact disk, or the like.

Figure 4B:
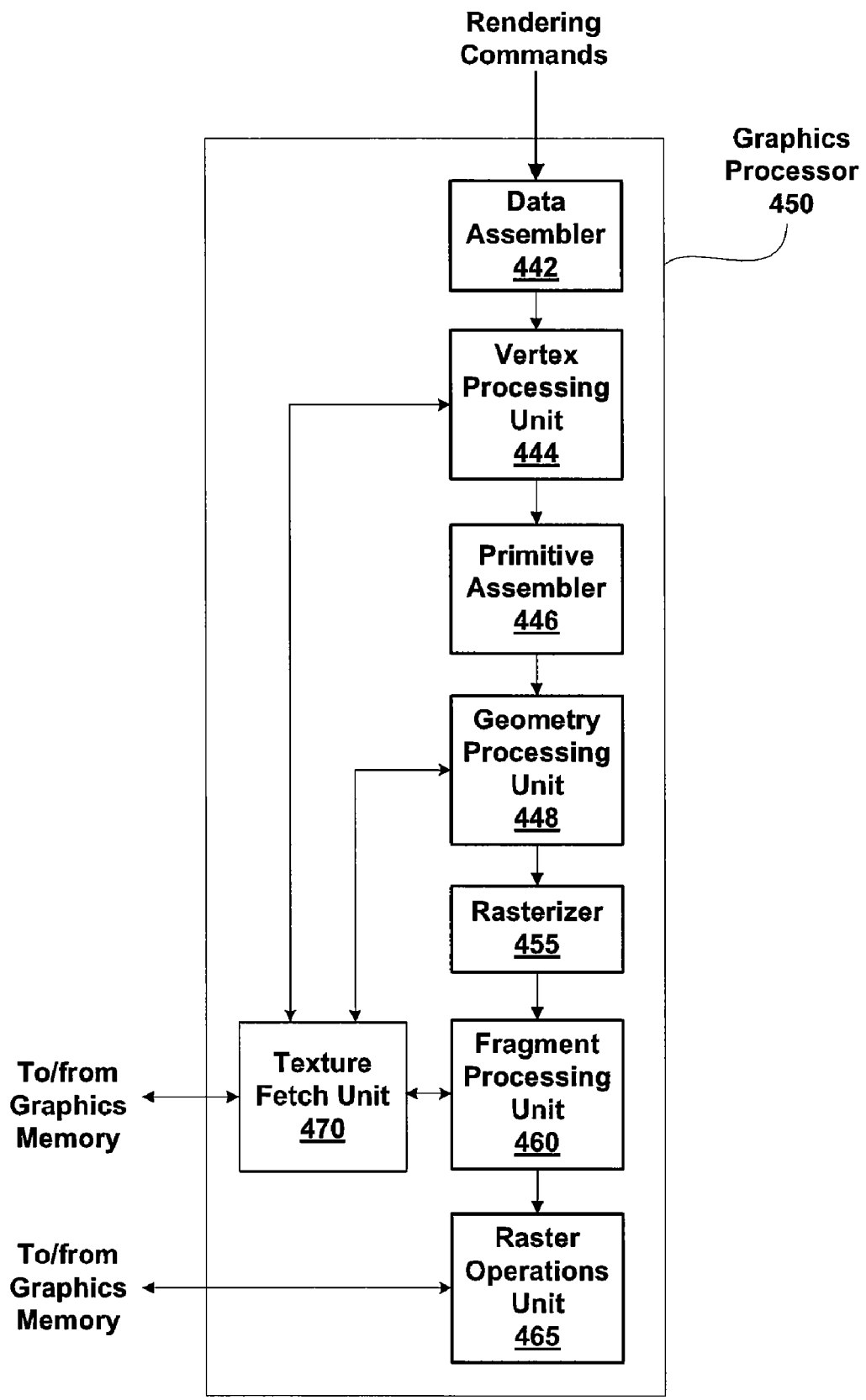
FIG. 4B illustrates the graphics processor of FIG. 4A in accordance with one or more aspects of the present invention.

FIG. 4B illustrates graphics processor 450 of FIG. 4A, in accordance with one or more aspects of the present invention. Graphics processor 450 includes a data assembler 442, vertex processing unit 444, a primitive assembler 446, geometry processing unit 448, a rasterizer 455, fragment processing unit 460, and a raster operations unit 465. Data assembler 442 is a fixed function unit that collects vertex data for high-order surfaces, primitives, and the like, and outputs the vertex data to vertex processing unit 444. Vertex processing unit 444 is a programmable execution unit that is configured to execute vertex shader programs, transforming vertex data as specified by the vertex shader programs. For example, vertex processing unit 444 may be programmed to transform the vertex data from an object-based coordinate representation (object space) to an alternatively based coordinate system such as world space or normalized device coordinates (NDC) space. Vertex processing unit 444 may read compressed high dynamic range data that is stored in local memory 440 through texture fetch unit 470 for use in processing the vertex data.

Primitive assembler 446 receives processed vertex data from vertex processing unit 444 and constructs graphics primitives, e.g., points, lines, triangles, or the like, for processing by geometry processing unit 448. Geometry processing unit 448 is a programmable execution unit that is configured to execute geometry shader programs, transforming graphics primitives received from primitive assembler 446 as specified by the geometry shader programs. For example, geometry processing unit 448 may be programmed to subdivide the graphics primitives into one or more new graphics primitives and calculate parameters, such as plane equation coefficients, that are used to rasterize the new graphics primitives. Geometry processing unit 448 outputs the parameters and new graphics primitives to rasterizer 455. Geometry processing unit 448 may read compressed high dynamic range data that is stored in local memory 440 through texture fetch unit 470 for use in processing the geometry data.

Rasterizer 455 scan converts the new graphics primitives and outputs fragments and coverage data to fragment processing unit 260. Fragment processing unit 460 is a programmable execution unit that is configured to execute fragment shader programs, transforming fragments received from rasterizer 455 as specified by the fragment shader programs. For example, Fragment processing unit 460 may be programmed to perform operations such as perspective correction, texture mapping, shading, blending, and the like, to produce shaded fragments that are output to raster operations unit 465. Fragment processing unit 460 may read compressed high dynamic range data that is stored in local memory 440 through texture fetch unit 470 for use in processing the fragment data. Texture fetch unit 470 produces read requests for compressed high dynamic range data stored as texels, decompresses the compressed high dynamic range data, and performs texture filtering operations, e.g., bilinear, trilinear, anisotropic, and the like, as described in conjunction with FIG. 5A. Raster operations unit 465 is a fixed function unit that optionally performs near and far plane clipping and raster operations, such as stencil, z test, and the like, and outputs pixel data as processed graphics data for storage in graphics memory. The processed graphics data may be stored in frame buffer 430 for display on display device 435.

Figure 5A:
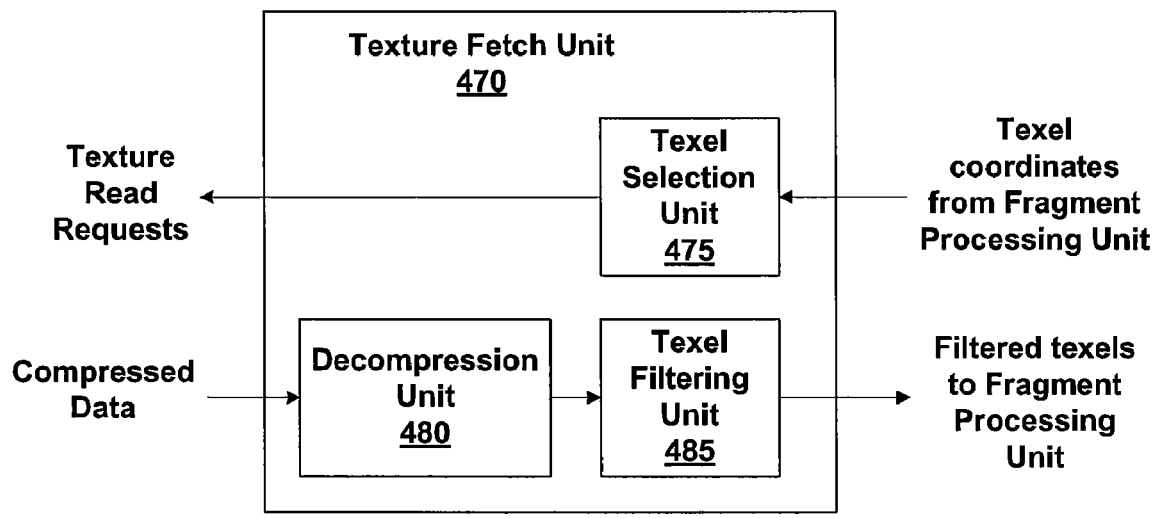
FIG. 5A illustrates the texture fetch unit of FIG. 4B in accordance with one or more aspects of the present invention.

FIG. 5A illustrates texture fetch unit 470 of FIG. 4B, in accordance with one or more aspects of the present invention. Texture fetch unit 470 includes a texel selection unit 475, a decompression unit 480, and a texture filtering unit 485. Texture selection unit 475 determines which texels should be read based on the texture map coordinates and computes the addresses for read requests. Decompression unit 480 receives the compressed high dynamic range data and decompressed the compressed high dynamic range data to produce decompressed high dynamic range values.

Texture filtering unit 485 receives the decompressed high dynamic range values and performs point sampling, bilinear filtering, trilinear filtering, or anisotropic filtering to produce filtered texel values that are output to fragment processing unit 460. Texture filtering unit 485 is configured to interpret the decompressed high dynamic range values as values represented in a floating point or fixed point format. Specifically, texture filtering unit 485 may be configured to perform the conversion operations represented by the code shown in TABLE 2. In some embodiments of the present invention additional texture fetch units 470 are coupled to other processing units within graphics processor 450, such as vertex processing unit 444 and geometry processing unit 448 to allow those units to obtain decompressed high dynamic range values for processing.

Figure 5B:
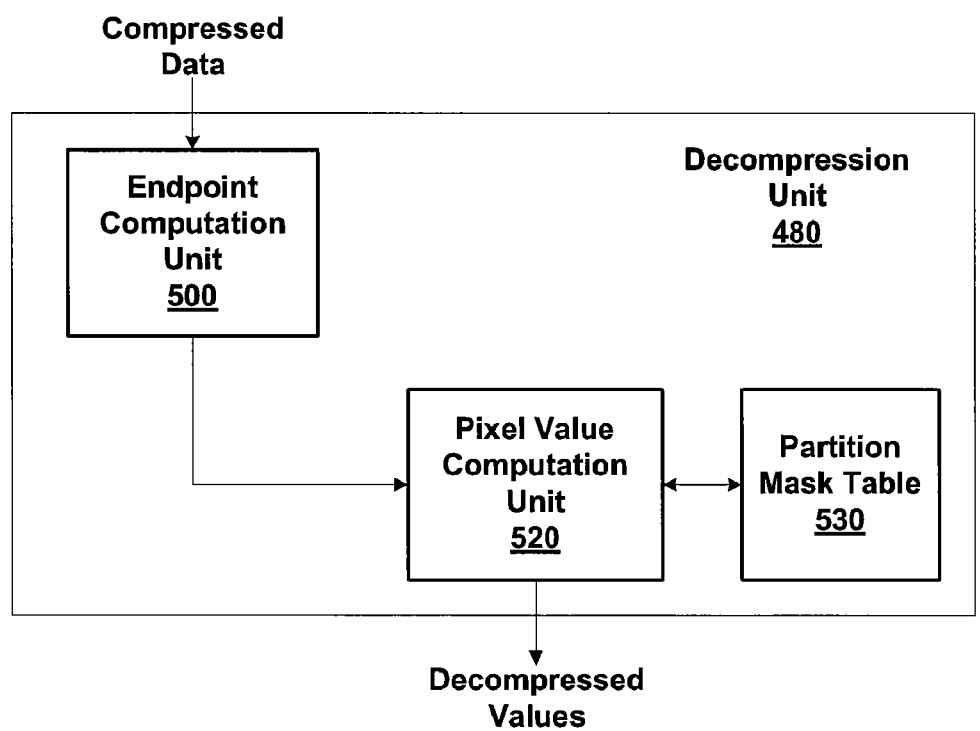

FIG. 5B is a block diagram of decompression unit 480, in accordance with one or more aspects of the present invention. Decompression unit 480 includes an endpoint computation unit 500, a pixel computation unit 520, and a partition mask table 530. Endpoint computation unit 500 receives the compressed high dynamic range data represented in the single endpoint pair format or in the dual endpoint pair format and performs steps 150 through 175 of FIG. 1B or steps 250 through 260 of FIG. 2B, respectively. Endpoint computation unit 500 is configured to decode the endpoint compression formats specified by Mode[4:0] as shown in TABLES 1 and 3. Endpoint computation unit 500 outputs decompressed integer endpoints (one or two pair), mode, pixel indices, and partition index to pixel computation unit 520.

Pixel value computation unit 520 performs step 185 of FIG. 1B and steps 270 through 285 of FIG. 2B to compute decompressed high dynamic range values for each pixel. Partition mask table 530 stores the partition masks specified by the partition index as shown in TABLE 4.

High Dynamic Range Compression with Compressed Indices

In an alternate embodiment of the current invention, the first compressed format includes a compressed endpoint field with two compressed endpoint values and an index field with compressed indices for the pixels in the block. As previously described, the redundancy of the endpoint colors is used to compress the endpoint values and specify them to a higher precision. Instead of reordering the endpoints to encode more endpoint value precision the indices are compressed. The second compressed format includes a compressed endpoint field with four compressed endpoint values, the partition index, and an index field with compressed indices for the pixels in the block. The second compressed format does not use reordered endpoints to encode additional bits of the partition index. Instead, more bits are used to represent the endpoint values and fewer bits are needed to store the compressed indices.

The different fields of the compression format have varying bit lengths dependent on which variation of the format is used to represent the compressed high dynamic range data. The index field of the compression format includes compressed indices that occupy 63 bits when a single region is used or 46 bits when two regions are used to compressed the fixed size block. The compressed indices are decompressed to produce a 3 bit index for each pixel within the fixed size block when two regions are used and a 4 bit index when a single region is used. The compressed endpoint field of the compression format includes compressed endpoints that occupy 72, 75, or 60 bits. Depending on the format variation, there may be two or four endpoint values encoded in compressed endpoints. When four endpoints are encoded two regions are used to compress the high dynamic range data and a 5 bit partition index is encoded in a fourth field.

Finally, a first field of the compression format includes a variable length mode that selects between 14 possible variations of the compression format. The mode bits specify the type of endpoint compression, e.g., truncation or four point transform, and the number of bits used for the endpoint values. TABLE 5 illustrates the compression format variations that are specified by the mode bits, for one embodiment of the present invention.

TABLE 5

| Mode | Endpoint differences | Endpoint bits | partitions | Index bits |
|---|---|---|---|---|
| 00 | yes (10.555) | 75 | 2 | 46 |
| 01 | yes (7666) | 75 | 2 | 46 |
| 00010 | yes (11.555 & 11.444) | 72 | 2 | 46 |
| 00110 | | | | |
| 01010 | | | | |
| 01110 | yes (9555) | 72 | 2 | 46 |
| 10010 | yes (8666 & 8555) | 72 | 2 | 46 |
| 10110 | | | | |
| 11010 | | | | |
| 11110 | no (6666) | 72 | 2 | 46 |
| 00011 | no (10.10) | 60 | 1 | 63 |
| 00111 | yes (11.9) | 60 | 1 | 63 |
| 01011 | yes (12.8) | 60 | 1 | 63 |
| 01111 | yes (16.4) | 60 | 1 | 63 |

The first ten modes of TABLE™ are two-region cases, so dual endpoint pairs are encoded in a 72 or 75 bit compressed endpoint field. The second bit of the mode field specifies whether the compressed endpoint field is 72 bits or 75 bits. The lsb of the mode field specifies whether one or two regions are used to compress the high dynamic range data. When two regions are specified dual endpoint pairs are encoded in the compressed endpoints field and when a single region is used a single endpoint pair is encoded in the compressed endpoints field. When the 00 mode is used, a reference endpoint is stored using ten bits for each channel. The reference endpoint is signed if the pixel format is signed. The channel values for the remaining three compressed endpoints are stored as signed 555 difference values. Since the number of endpoints is four, the number of partitions is two and there are 46 bits of compressed indices that are decompressed to produce 48 bits of indices (3 bits per pixel). When two regions are used, a 5 bit partition index is used to determine the partition mask (not shown in TABLE 5).

When mode 01 is used, the reference endpoint is stored as a 777 value and the remaining endpoints are stored as signed 666 difference values. Four 24 bit endpoint values (96 bits) are compressed into 75 bits. When modes 00010, 00110, or 01010 are used the reference endpoint is stored as an 11.11.11 value. The channel values for the two of the remaining compressed endpoints are stored as signed 444 difference values and the fourth compressed endpoint that is stored as a signed 555 value.

When mode 01110 the reference endpoint is stored as a 999 value and the remaining endpoints are stored as signed 555 difference values. When modes 10010, 10110, or 11010 are used the reference endpoint is stored as an 888 value. The channel values for the two of the remaining compressed endpoints are stored as signed 555 difference values and the fourth compressed endpoint that is stored as a signed 666 value.

When mode 11110 is used, each channel of the four endpoint values is specified directly as an unsigned or signed value (depending on the pixel format) rather than as a single reference endpoint and differences. Specifically, the four endpoint values are stored as 666 values. When mode 00011 is used, a single endpoint pair is specified for a single region. Therefore, a partition index is not included. Each channel of the two endpoint values is specified directly as an unsigned signed value (depending on the pixel format) rather than as a single reference endpoint and differences. Specifically, the two endpoint values are stored as 10.10.10 values, for a total of 60 bits. When a region is used to compress the high dynamic range data the compressed indices are stored as 63 bits that decompress to produce 4 bits per pixel.

When mode 00111 is used, the reference endpoint is stored as an 11.11.11 value and the remaining endpoints are stored as signed 999 difference values. When mode 01011 is used, the reference endpoint is stored as a 12.12.12 value and the remaining endpoints are stored as signed 888 difference values. When mode 00111 is used, the reference endpoint is stored as a 16.16.16 value and the remaining endpoints are stored as signed 444 difference values. In other embodiments of the present invention, different numbers of bits may be used to represent the endpoints and different combinations of partitioning and endpoint compression may be used to represent the compressed high dynamic range data. There are four unused mode values which are available for other encodings.

Figure 6A:
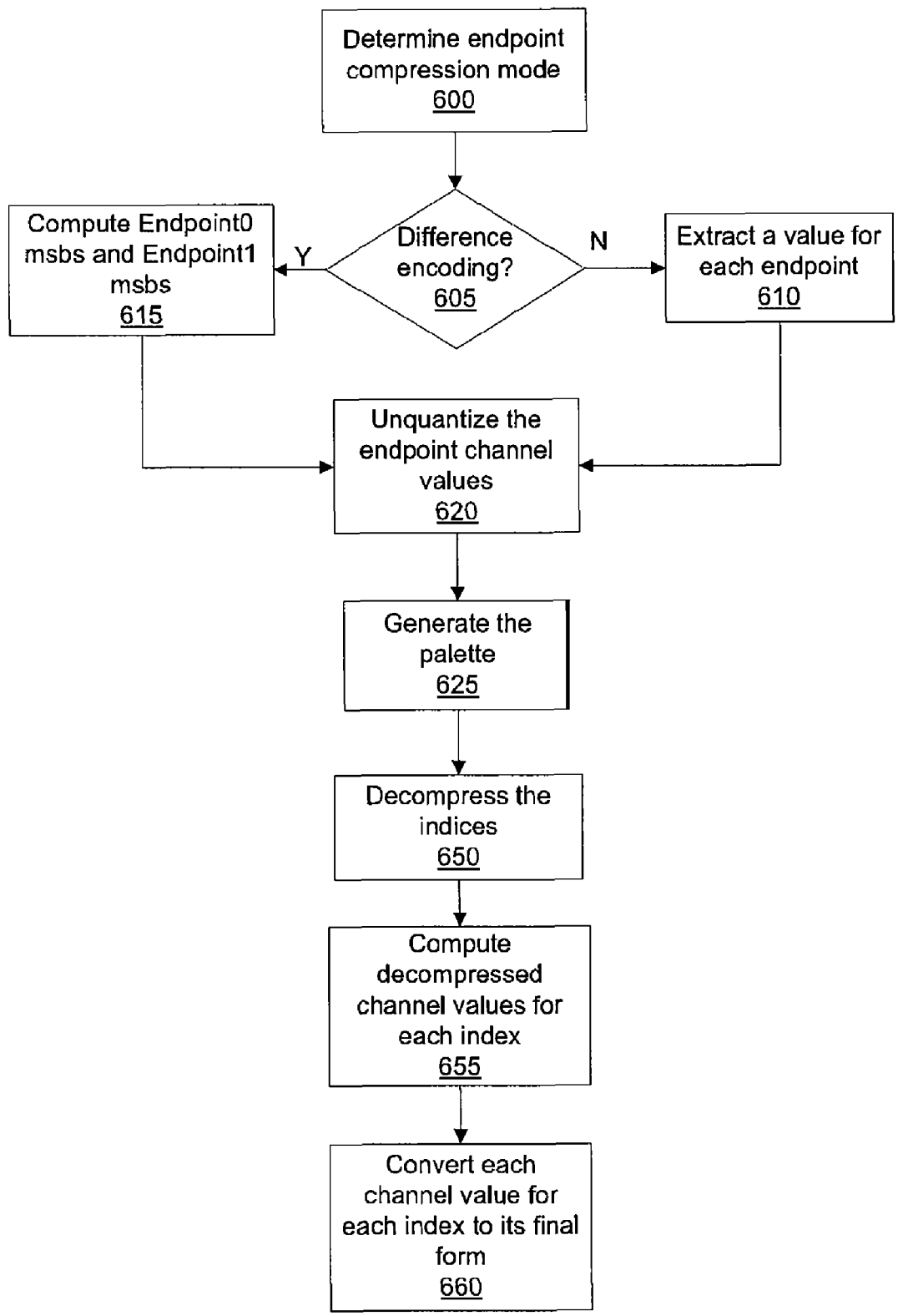
FIG. 6A illustrates a flow diagram of an exemplary method of decompressing data represented in the format that includes compressed indices in accordance with one or more aspects of the present invention.

FIG. 6A illustrates a flow diagram of an exemplary method of decompressing data represented in the format that includes compressed indices in accordance with one or more aspects of the present invention. In step 600 the method determines the endpoint compression mode that is specified by the mode bits. In step 605 the method determines if the endpoint pair is encoded using difference encoding. If, in step 605 the method determines that difference encoding is not specified by the endpoint compression mode, then in step 610 the method extracts the most significant bits (msbs) of each channel for each endpoint. When a single endpoint pair is used, each endpoint channel value is stored as a 10 bit value.

If, in step 605 the method determines that difference encoding is specified by the endpoint compression mode, then in step 615 the method computes the quantized endpoints. Note that the difference encoding of the endpoints is lossless. When the difference encoding modes are used, the msbs of Endpoint0 are directly specified and the msbs of Endpoint1 are computed by sign extending the compressed endpoint1 value (difference) for each channel and summing it with the corresponding channel of Endpoint0. Each of the six channel values for Endpoint0 and Endpoint1 are 10 to 16 bit signed or unsigned values.

In the process of compressing the image, the compressor generates full-precision 17 bit signed channel values for the endpoints in order to easily represent both 16 bit unsigned values and 16 bit signed values. In order to fit these endpoints in the space available in the format, they are quantized into fewer bits.

Conceptually, the quantized values are bins, with each bin representing a range of unquantized values. When the quantized values are unquantized, it is assumed that each bin represents a number of unquantized values that is as equal as possible. Since the channel values for each pixel are computed using unquantized values, it is important that the entire range of valid values can be produced. Therefore, the extreme bins (1 and $2^i-1$, where i is the quantization precision) are unquantized to the limits of the full-precision range.

In step 620 the six channel values are unquantized to produce six 16 bit signed or unsigned channel values as decompressed Endpoint0 and Endpoint1. Specifically, 16 bit (signed or unsigned, integers or floats) quantized values are simply output as the unquantized values (the reference endpoint for mode 0xf shown in TABLE 5). In step 620, the extreme bins (0 and $2^{p-1}$ for unsigned pixel formats, where p is the precision of the endpoints) and $-2^{p-1}$ and $2^{p-1}-1$ for signed formats) are unquantized to the endpoints of the full-precision range. For example, for unsigned f16 (16 bit floating point), bin 0 returns 0 rather than the midpoint of the range of unquantized values that map to bin 0. Note that the unquantization is magnitude based and symmetric about 0. Therefore, signed values, such as bins −1 and 1, will unquantize to the same magnitude. Unquantized channel values are computed, using the code shown in TABLE 6. In TABLE 6 unq is an unquantized channel value, q is a quantized channel value, prec is the precision (16 bits), s is a sign bit, U16MAX, S16MAX are the maximum limits of the full-precision range, 0xFFFF and 0x7FFF, respectively, and S16MIN is the minimum limit of the signed 16 bit integer range (−0x8000).

TABLE 6

```
int Utils::unquantize(int q, int prec)
{
int unq, s;
assert (prec > 1);   // not implemented for prec 1
switch (Zoh::FORMAT)
{
case UNSIGNED_F16:
    if (prec >= 15)
        unq = q;
    else if (q == 0)
        unq = 0;              // return extreme
    else if (q == ((1<<prec)-1))
        unq = U16MAX;         // return extreme
    else
        // return midpoint
        unq = (q * (U16MAX+1) + (U16MAX+1)/2) >> prec;
    break;
case SIGNED_F16:
    if (prec >= 16)
        unq = q;
    else
    {
        if (q < 0) { s = 1; q = -q; } else s = 0;
        if (q == 0)
            unq = 0;
        else if (q == ((1<<(prec-1))-1))
            unq = s ? -S16MAX : S16MAX;
        else
        {
            unq =(q *(S16MAX+1)+(S16MAX+1)/2)>>(prec-1);
            if (s)
                unq = -unq;
        }
    }
    break;
case UNSIGNED_INT16:
    if (prec >= 16)
        unq = q;
    else if (q == 0)
        unq = 0;
    else if (q == ((1<<prec)-1))
        unq = U16MAX;
    else
        unq = (q * (U16MAX+1) + (U16MAX+1)/2) >> prec;
    break;
case SIGNED_INT16:
    if (prec >= 16)
        unq = q;
    else
    {
        if (q < 0) { s = 1; q = -q; } else s = 0;
        if (q == 0)
            unq = 0;
        else if (q == ((1<<(prec-1))-1))
            unq = s ? -S16MAX : S16MAX;
        else if (q == (1<<(prec-1)))
        {
            assert (s);
            unq = S16MIN;
        }
        else
        {
            unq =(q *(S16MAX+1)+(S16MAX+1)/2)>>(prec-1);
            if (s)
                unq = -unq;
        }
    }
    break;
}
return unq;
}
```

Note that for unsigned values, multiplication by U16MAX+1, e.g., (0xFFFF+1), is simply a binary shift operation and adding (U16MAX+1)/2, e.g, (0xFFFF+1)/2, to the shifted value can be accomplished by performing a logical OR instead. Similarly, for signed values, a binary shift operation and logical OR may be used to simplify the unquantization computation. Additionally, since the value of prec is known, the second shift can be combined with the first one, so the circuitry for unquantization is simple and compact. In alternate embodiments of the present invention, the shifted value is logically OR'd with a value 1 smaller, e.g., (U16MAX)/2, instead of (U16MAX+1)/2 to compute unquantized values.

In some embodiments of the present invention, a final step of the unquantization occurs after the palette is generated, i.e., after step 625 to ensure that the quantized values access the full useful range of floating point values from 0 to just below the first NaN's (not a number) bit pattern. The unquantized values are scaled by 31 to compute the final palette values the 0 to F16MAX (for unsigned) or −F16MAX to F16MAX (for signed) range. The code shown in TABLE 7 for a finish_unquantize function applies the final scaling.

TABLE 7

```
int Utils::finish_unquantize(int q, int prec)
{
    if (ZOH::FORMAT == UNSIGNED_F16 && prec < 15)
        return (q * 31) >> 6; // scale by 31/64
    else if (ZOH::FORMAT == SIGNED_F16 && prec < 16)
        // scale by 31/32
        return (q < 0) ? -(((-q) * 31) >> 5) : (q * 31) >> 5;
    else
        return q;
}
```

Endpoint0 and Endpoint1 are then used to compute a palette for the block in step 625. The palette includes 16 values for each channel. Two of the values are specified by the endpoints and the other 14 values lie between the endpoints. Each value is computed using a weight that is programmable or static. Generation of the palette is described in conjunction with FIG. 6B.

Figure 6B:
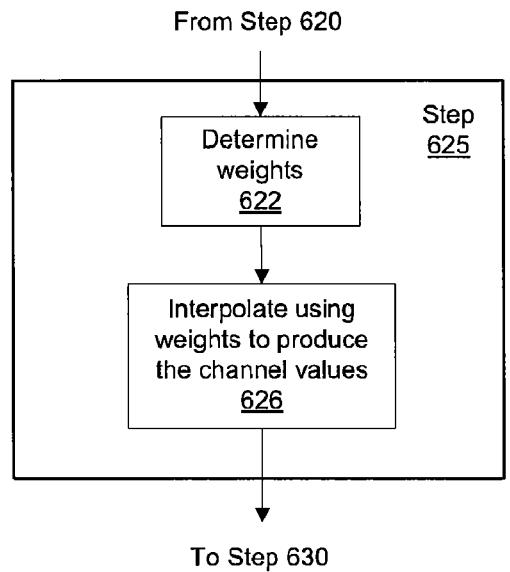
FIGS. 6B and 6C illustrate flow diagrams of exemplary methods of performing steps shown in FIG. 6A in accordance with one or more aspects of the present invention.
Figure 6C:
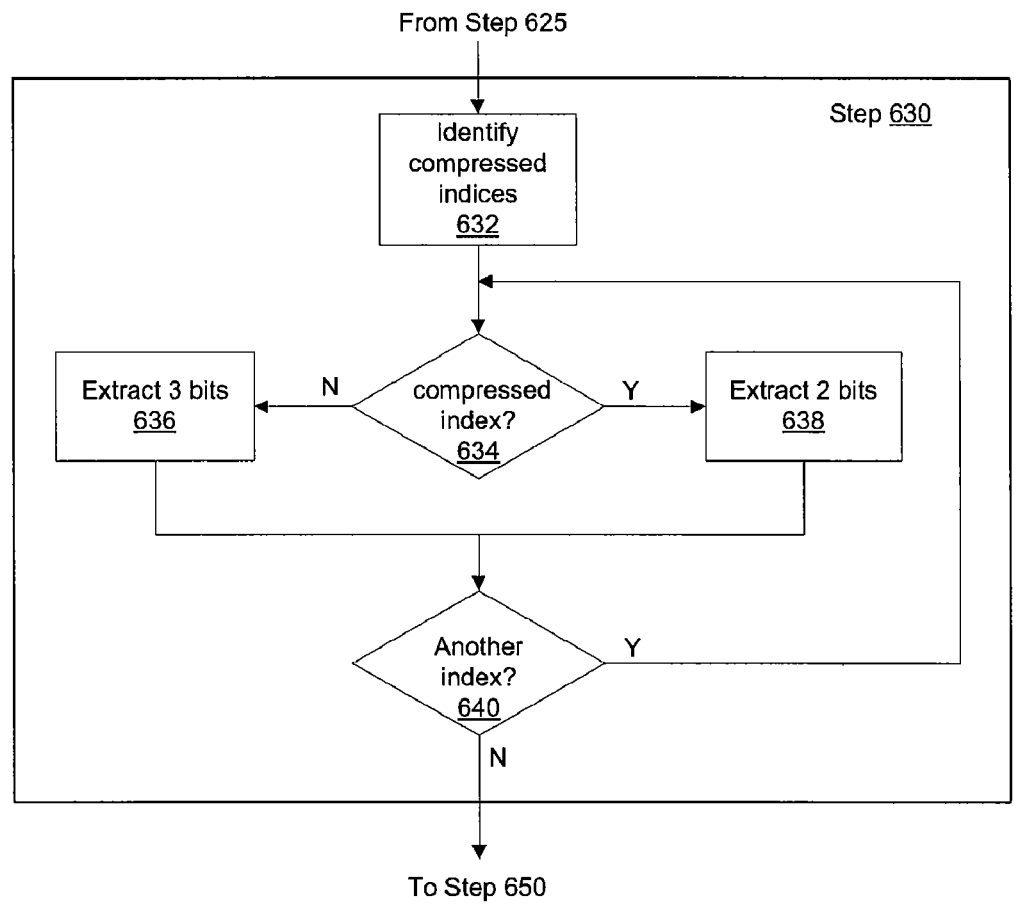

In step 650 the method decompresses the compressed indices to produce a four bit index for each pixel, as described in conjunction with FIG. 6C. Note that step 650 may be completed in parallel with one or more of steps 600, 605, 610 or 615, 620 and 625 since decompressing of the pixel indices is not dependent on the endpoint values. The decompressed pixel indices, the palette, Endpoint0, and Endpoint1 are then used to compute high dynamic range values for each pixel of a block. In step 655 the method determines a decompressed value for the channels of each pixel by using the pixel index to select one of the 16 palette values for each pixel. In step 660 the method converts the channel values computed in step 655 to a final format based on the texture format that is specified, e.g., signed fp16 (16 bit floating point), unsigned fp16, signed 16 bit integer, and unsigned 16 bit integer, as previously described in conjunction with FIG. 1B.

FIG. 6B illustrates a flow diagram of an exemplary method of performing step 625 shown in FIG. 6A, in accordance with one or more aspects of the present invention. In step 622 the method determines the weights that are used to interpolate between the endpoints of the single endpoint pair. In one embodiment of the present invention the weights of 0, 9, 17, 26, 34, 43, 51, 60, 68, 77, 85, 94, 102, 111, 119, and 128 are used to produce a palette of 16 values for each channel. In step 626 the following equation is evaluated to produce the palette for each channel:

$$Pixel_c = Endpoint0_c + (((Endpoint1_c - Endpoint0_c) * weight[index]) >> shift) \quad \text{(eq. 2)}$$

where c corresponds to each channel, e.g., red, green, blue, or the like and shift is 7 for a single endpoint pair and 6 for dual endpoint pairs.

A channel value is selected from the palette using the decompressed index values. In some embodiments of the present invention, one of the indices for each endpoint pair has an msb (most significant bit) of zero or one, and therefore only 2 of the 3 bits are stored. FIG. 6C illustrates a flow diagram of an exemplary method of performing step 630 shown in FIG. 6A, in accordance with one or more aspects of the present invention. In step 632 the method identifies the indices that are compressed. The index corresponding to pixel position (0,0) is always compressed. When dual endpoint pairs are used two of the sixteen indices are compressed, as described in conjunction with FIG. 7A.

In step 634 the method determines if a first index of the compressed indices is compressed, and, if so, 2 bits are extracted from the compressed indices and a zero is appended in the msb position to decompress the compressed index. In other embodiments of the present invention, an implied leading one is used in the compressed indices and a one is appended in the msb position to decompress the compressed index. Otherwise, in step 636 3 bits are extracted from the compressed indices to produce a 3 bit index. In step 640 the method determines if another index is included in the compressed indices, i.e., if fewer than sixteen indices have been decompressed, and, if so, the method returns to step 634. Otherwise, the method has compressed all sixteen indices and proceeds to step 650 of FIG. 6A.

Figure 7A:
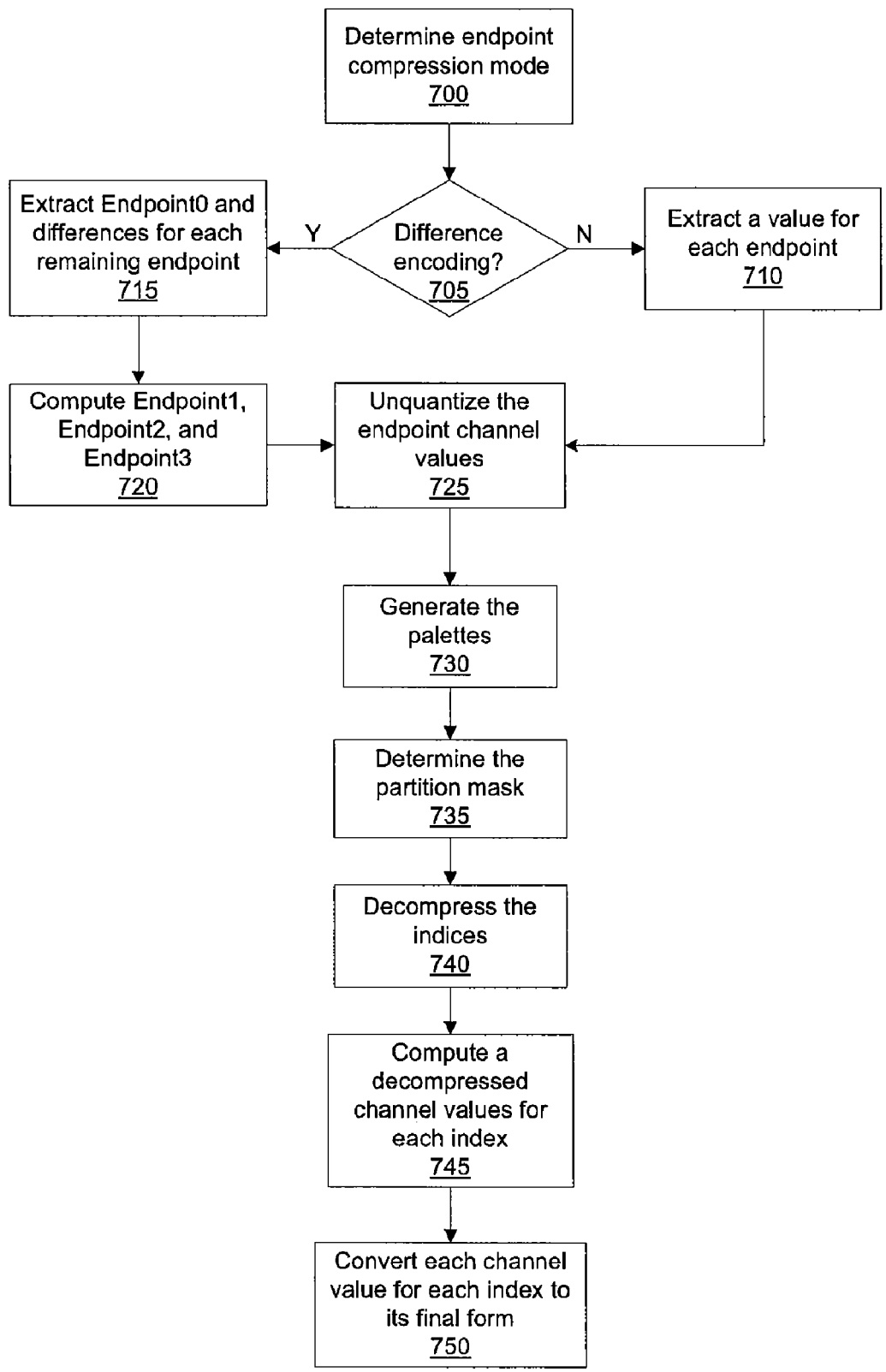
FIG. 7A illustrates a flow diagram of an exemplary method of decompressing data represented in the format that includes compressed indices and a partition index in accordance with one or more aspects of the present invention.

FIG. 7A illustrates a flow diagram of an exemplary method of decompressing data represented in the format that includes compressed indices and a partition index, in accordance with one or more aspects of the present invention. The partition index is used to indicate which of two regions each pixel lies within. Each of the two regions corresponds to one of the two dual endpoint pairs. In step 700 the method determines the endpoint compression mode that is specified by the mode bits. When the endpoint compression mode indicates that a single endpoint pair is used, then the method shown in FIGS. 6A, 6B, and 6C is used to decompress the fixed size block.

In step 705 the method determines if the dual endpoint pairs are encoded using difference encoding. If, in step 705 the method determines that difference encoding is not specified by the endpoint compression mode, then in step 710 the method extracts the most significant bits (msbs) of each channel for each endpoint. When dual endpoint pairs are used to compress the high dynamic range data, each endpoint channel value is stored as a 6 bit value.

If, in step 705 the method determines that difference encoding is specified by the endpoint compression mode, then in step 715 the method extracts the msbs of Endpoint0 and the msbs of the compressed channel difference values for Endpoint1, Endpoint2, and Endpoint3. In step 720 the msbs of Endpoint1, Endpoint2, and Endpoint3 are computed by sign extending the compressed channel difference values and summing each value with the corresponding channel of Endpoint0. Each of the six channel values for Endpoint0, Endpoint1, Endpoint2, and Endpoint3 are 6 to 11 bit signed or unsigned values.

In step 725 the six channel values are unquantized, as previously described in conjunction with step 620, to produce twelve 16 bit signed channel values as decompressed Endpoint0, Endpoint1, Endpoint2, and Endpoint3. Endpoint0 and Endpoint1 are then used to compute a palette for the block. The palette includes 8 values for each channel. Two of the values are specified by the endpoints and the other 6 values lie between the endpoint values. Each value is computed using a weight that is programmable or static. In step 730 the method determines the weights that are used to interpolate between the endpoints of the endpoint pairs and uses equation 2, with N equal to 64 to produce a palette of eight values for each channel of each endpoint pair. In one embodiment of the present invention the weights of 0, 9, 18, 27, 37, 46, 55, and 64 are used to produce the channel values.

Figure 7B:
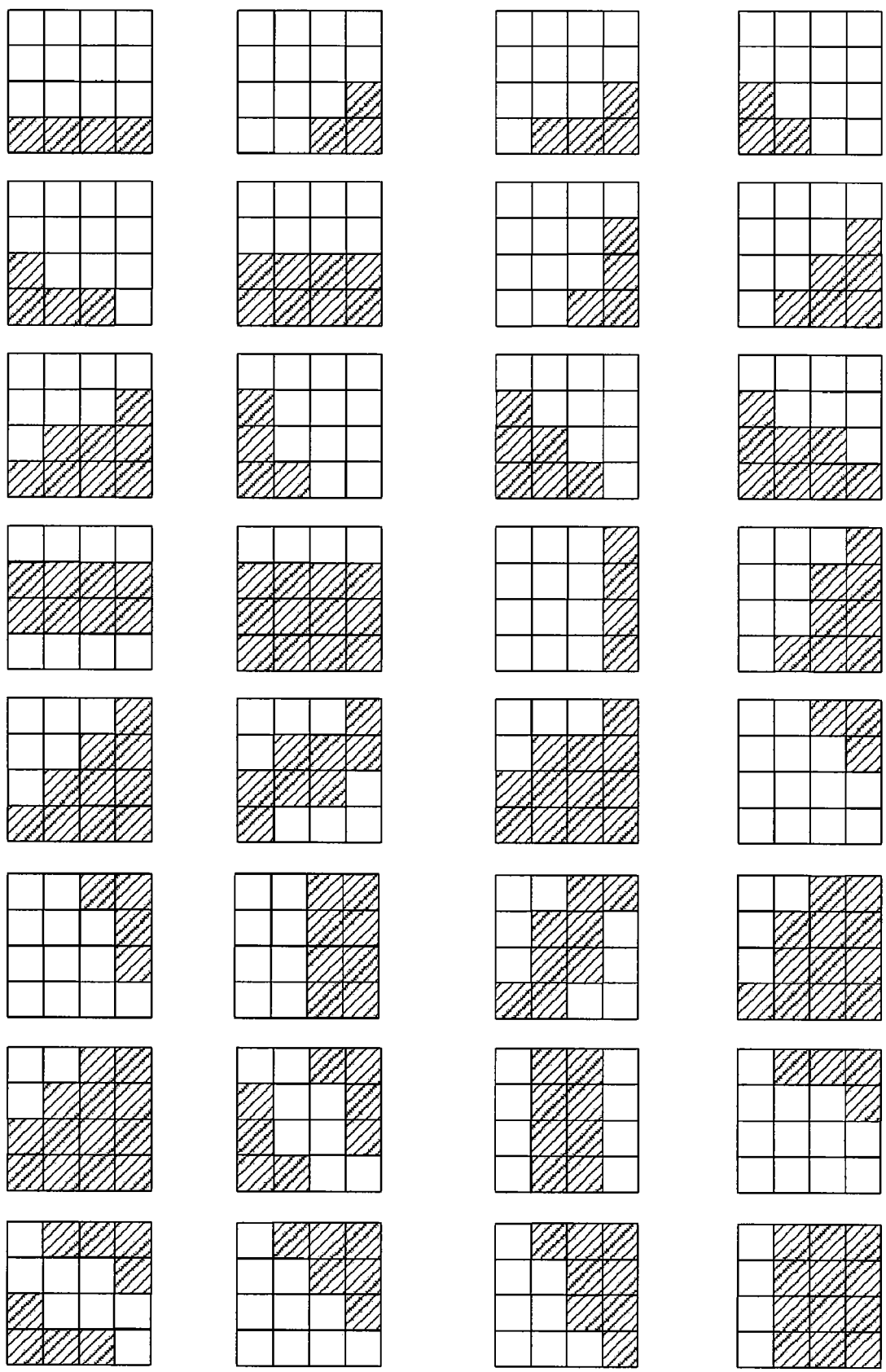
FIG. 7B illustrates partition masks for the partition index in accordance with one or more aspects of the present invention

In step 735 the method determines the partition mask using the partition index. FIG. 7B illustrates 32 partition masks for the 32 different partition index values, in accordance with one or more aspects of the present invention. In other embodiments of the present invention, different partition masks are defined.

In step 740 the method decompresses the compressed indices to produce a three bit index for each pixel. Note that step 740 may be completed in parallel with one or more of steps 700, 705, 710 or 715 and 720, 725 and 730 since decompressing of the pixel indices is not dependent on the endpoint values. Similarly, step 735 may be completed in parallel with step 740. As in the case of the single endpoint pair, the index corresponding to pixel position (0,0) is compressed. TABLE 8 shows which indices are compressed for each partition index when two partitions are used to compress the high dynamic range data. For example, when the partition index is a value 0-8, index 0 has an msb of zero for the first partition and index 15 has an msb of zero for the second partition. When the partition index is a value of 3, index 0 has an msb of zero for the first partition and index 8 has an msb of zero for the second partition. When the partition index is a value of 19, index 0 has an msb of zero for the first partition and index 2 has an msb of zero for the second partition.

TABLE 8

| Partition index[4:0] | Compressed indices |
|---|---|
| 0-8, 11, 13-16, 18, 21, 23, 24, 30, 31 | 0, 15 |
| 3, 4, 9, 10, 12 17, 25, 28 | 0, 8 |
| 19, 20, 22, 26, 27, 29 | 0, 2 |

The decompressed pixel indices, the palettes, the partition mask, and the decompressed endpoint pairs are then used to compute high dynamic range values for each pixel of a block. In step 745 the method determines a decompressed value for the channels of each pixel by using the pixel index and partition mask to select one of the 8 palette values for each pixel. In step 750 the method converts the channel values computed in step 745 to a final format based on the texture format that is specified, e.g., signed fp16 (16 bit floating point), unsigned fp16, signed 16 bit integer, and unsigned 16 bit integer, as previously described in conjunction with FIG. 1B.

Figure 8:
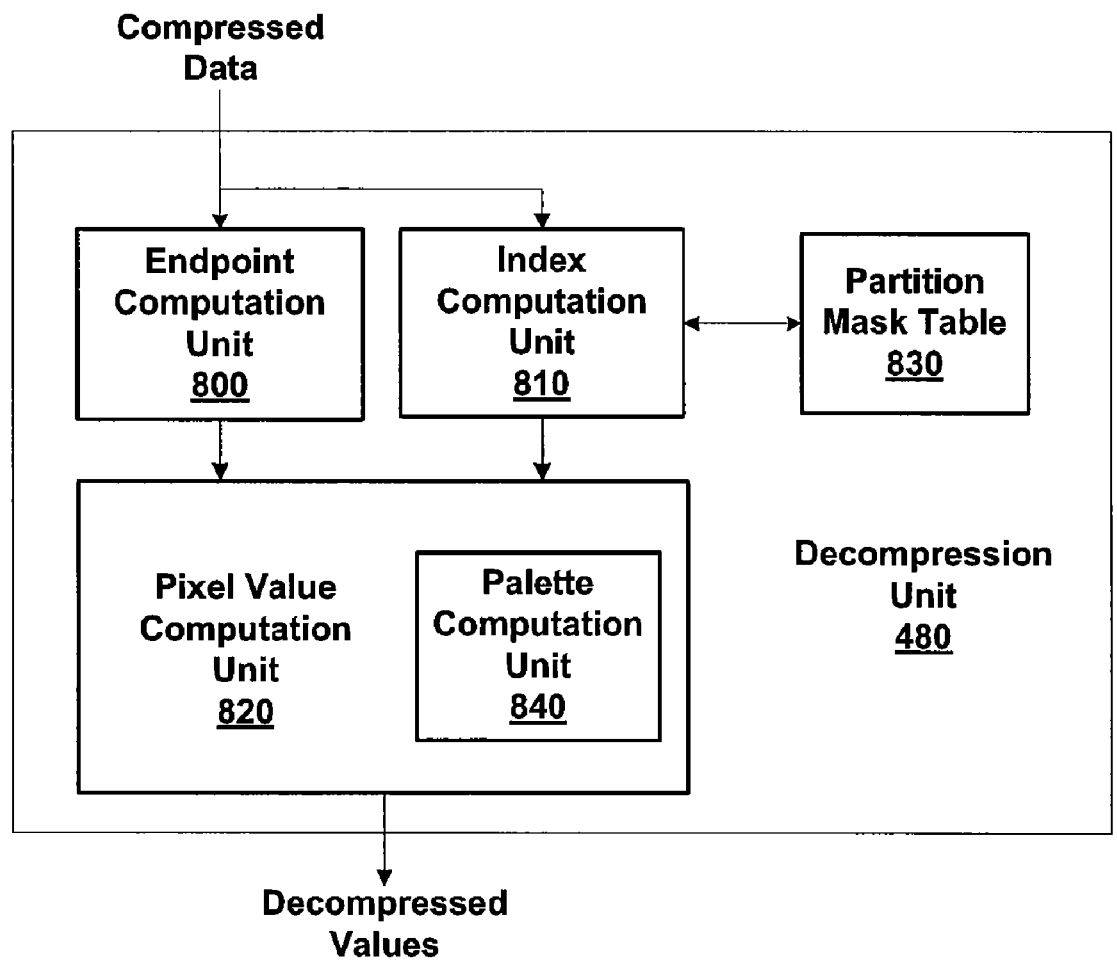
FIG. 8 is another block diagram of a decompression unit in accordance with one or more aspects of the present invention.

FIG. 8 is another block diagram of decompression unit 480 of FIG. 5A, in accordance with one or more aspects of the present invention. When compressed indices are used, decompression unit 480 includes an endpoint computation unit 800, an index computation unit 810, a pixel computation unit 820, and a partition mask table 830. Endpoint computation unit 800 receives the compressed high dynamic range data represented in the single endpoint pair format or in the dual endpoint pair format and performs steps 605 through 620 of FIG. 6A or steps 705 through 725 of FIG. 7A, respectively.

Endpoint computation unit 800 is configured to decode the endpoint compression formats specified by the mode bits as shown in TABLE 5. Endpoint computation unit 800 outputs decompressed integer endpoints (one or two pair) to pixel computation unit 820.

Index computation unit 810 receives the compressed high dynamic range data represented in the single endpoint pair format or in the dual endpoint pair format and performs step 650 FIG. 6A or steps 735 and 740 of FIG. 7A, respectively. Partition mask table 830 stores the partition masks specified by the partition index as shown in FIG. 7B. Index computation unit 810 is configured to read the partition mask corresponding to the partition index and decompress the pixel indices. Index computation unit 810 outputs decompressed pixel indices and the partition mask to pixel computation unit 820.

Pixel value computation unit 820 includes a palette generation unit 840 and Palette generation unit 840 receives the decompressed endpoint values and decompressed pixel indices and performs step 625 of FIG. 6A and step 730 of FIG. 7A to produce a palette for each endpoint pair. Pixel value computation unit 820 receives the decompressed endpoint values, decompressed pixel indices, and the partition mask and computes decompressed high dynamic range values for each pixel using the palette(s) provided by palette generation unit 840.

Persons skilled in the art will appreciate that any system configured to perform the method steps of FIG. 1B, 2B, 3, 6A, 6B, 6C, or 7A or their equivalents, are within the scope of the present invention. The current invention involves new systems and methods for representing high dynamic range data in compressed formats with a fixed size block. The compression scheme has a compression rate of 8 bpp and is lossless in terms of visual quality compared with uncompressed 48 bpp high dynamic range data. The compressed high dynamic range data may be stored in less memory than high dynamic range data that is not compressed. High dynamic range data that is encoded in the compressed format may be efficiently decompressed in hardware. Because the fixed size block of data is compressed into a fixed length format, it is possible to determine the location of each particular block of data, permitting random access of the compressed data.

Fixed size pixel blocks are compressed into 128 bits that include two or four compressed endpoint values with three channels and an index for each pixel in the block. Different blocks within a single image may use a different compressed format (specified by the mode bits), varying the number of compressed endpoint values (two or four) and the endpoint compression mode. When four endpoint values are used a partition index specifies a mask for each pair of the four endpoint values to provide higher quality compression for blocks with more pixel variation that can be represented using a single linear interpolation computation.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

While the foregoing is directed to embodiments of the present invention, other and further embodiments of the invention may be devised without departing from the basic scope thereof, and the scope thereof is determined by the claims that follow. The foregoing description and drawings are, accordingly, to be regarded in an illustrative rather than a restrictive sense. The listing of steps in method claims do not imply performing the steps in any particular order, unless explicitly stated in the claim.

All trademarks are the respective property of their owners.

The invention claimed is:

1. A method of decompressing high dynamic range data represented in a compressed format, comprising:
   determining an endpoint compression mode that is specified by the compressed format;
   extracting a first decompressed endpoint from a compressed endpoint field of the compressed format;
   extracting one or more remaining compressed endpoints from the compressed endpoint field of the compressed format;
   computing, using a processor, a second decompressed endpoint when the endpoint compression mode indicates that the one or more remaining compressed endpoints are encoded as differences;
   computing a third decompressed endpoint and a fourth decompressed endpoint when the endpoint compression mode indicates that dual endpoint pair compression is used to encode the high dynamic range data;
   extracting compressed indices from the compressed format;
   decompressing the compressed indices to produce decompressed indices that include an index for each pixel in a fixed sized block; and
   computing a decompressed high dynamic range value for each channel of each of the pixels in the fixed size block using the first decompressed endpoint and the second decompressed endpoint or the first decompressed endpoint, the second decompressed endpoint, the third decompressed endpoint, and the fourth decompressed endpoint and the decompressed indices.

2. The method of claim 1, further comprising:
   obtaining the second decompressed endpoint from the one or more remaining compressed endpoints when the endpoint compression mode indicates that the one or more remaining compressed endpoints are not encoded as differences; and
   obtaining the third decompressed endpoint and the fourth decompressed endpoint from the one or more remaining compressed endpoints when the endpoint compression mode indicates that dual endpoint pair compression is used to encode the high dynamic range data.

3. The method of claim 1, wherein the computing of the second decompressed endpoint comprises:
   sign extending the one or more remaining compressed endpoints to produce a sign extended second compressed endpoint; and
   summing the sign extended second compressed endpoint with the first decompressed endpoint to produce the second decompressed endpoint.

4. The method of claim 3, wherein the computing of the third decompressed endpoint and the fourth decompressed endpoint comprises:
   sign extending the one or more remaining compressed endpoints to produce a sign extended third compressed endpoint and a sign extended fourth compressed endpoint;
   summing the sign extended third compressed endpoint with the first decompressed endpoint to produce the third decompressed endpoint; and
   summing the sign extended fourth compressed endpoint with the second decompressed endpoint to produce the fourth decompressed endpoint.

5. The method of claim 1, further comprising the step of determining a partition mask that is specified by the compressed format and includes a bit for each of the pixels in the fixed size block to indicate a portion of the pixels in the fixed size block that are compressed using the first decompressed endpoint and the second decompressed endpoint and a remaining portion of the pixels in the fixed size block that are compressed using the third decompressed endpoint and the fourth decompressed endpoint.

6. The method of claim 5, wherein the step of computing a decompressed high dynamic range value for each channel of each pixel in the fixed size block comprises:
   generating a first palette including a plurality of decompressed high dynamic range values by interpolating between the first decompressed endpoint and the second decompressed endpoint using a set of weights, wherein each weight corresponds to a possible index value;
   generating a second palette including a plurality of decompressed high dynamic range values by interpolating between the third decompressed endpoint and the fourth decompressed endpoint using the set of weights; and
   selecting one of the plurality of decompressed high dynamic range values in the first palette or the second palette for each channel of each pixel in the fixed size block using a decompressed index for the pixel and the partition mask.

7. The method of claim 1, wherein the step of decompressing the compressed indices comprises determining a bit of one of the compressed indices based on a partition index that is specified by the compressed format.

8. The method of claim 1, wherein the step of computing a decompressed high dynamic range value for each channel of each pixel in the fixed size block comprises:
   generating a palette including a plurality of decompressed high dynamic range values by interpolating between the first decompressed endpoint and the second decompressed endpoint using a set of weights, wherein each weight corresponds to a possible index value; and
   selecting one of the plurality of decompressed high dynamic range values in the palette for each channel of each pixel in the fixed size block using a decompressed index for the pixel.

9. The method of claim 1, wherein the step of decompressing the compressed indices comprises appending a zero in the most significant bit position of one of the compressed indices.

10. The method of claim 1, further comprising the step of unquantizing channels of the first decompressed endpoint and channels of the second decompressed endpoint to produce 16 bit floating point or integer values that are signed or unsigned.

11. A system for decompressing high dynamic range data represented in a compressed format, comprising:
   an endpoint computation unit, comprising a processor and a memory, configured to
      determine an endpoint compression mode that is specified by the compressed format;
      extract a first decompressed endpoint from a compressed endpoint field of the compressed format;
      extract one or more remaining compressed endpoints from the compressed endpoint field of the compressed format;

compute a second decompressed endpoint when the endpoint compression mode indicates that the one or more remaining compressed endpoints are encoded as differences; and compute a third decompressed endpoint and a fourth decompressed endpoint when the endpoint compression mode indicates that dual endpoint pair compression is used to encode the high dynamic range data;

an index computation unit configured to extract compressed indices from the compressed format; and decompress the compressed indices to produce decompressed indices that include an index for each pixel in a fixed sized block; and a pixel value computation unit coupled to the endpoint computation unit and the index computation unit, and configured to compute a decompressed high dynamic range value for each channel of each of the pixels in a fixed size block using the first decompressed endpoint and the second decompressed endpoint or the first decompressed endpoint, the second decompressed endpoint, the third decompressed endpoint, and the fourth decompressed endpoint and the decompressed indices.

12. The system of claim 11, wherein the endpoint computation unit is further configured to unquantize channels of the first decompressed endpoint and channels of the second decompressed endpoint to produce 16 bit floating point or integer values that are signed or unsigned.

13. The system of claim 11, further comprising a partition mask table that is coupled to the index computation unit and configured to store partition masks corresponding to a partition index that is specified by the compressed format, wherein each partition mask includes a bit for each pixel in the fixed size block to indicate a portion of the pixels in the fixed size block that are compressed using the first decompressed endpoint and the second decompressed endpoint and a remaining portion of the pixels in the fixed size block that are compressed using the third decompressed endpoint and the fourth decompressed endpoint.

14. The system of claim 13, wherein the index computation unit is further configured to determine a bit of one of the compressed indices based on the partition index.

15. The system of claim 13, further comprising a palette generation unit configured to generate a first palette including a plurality of decompressed high dynamic range values by interpolating between the first decompressed endpoint and the second decompressed endpoint using a set of weights, wherein each weight corresponds to a possible index value;

generate a second palette including a plurality of decompressed high dynamic range values by interpolating between the third decompressed endpoint and the fourth decompressed endpoint using the set of weights; and select one of the plurality of decompressed high dynamic range values in the first palette or the second palette for each channel of each pixel in the fixed size block using a decompressed index for the pixel and the partition mask.

16. The system of claim 13, further comprising a palette generation unit configured to generate a palette including a plurality of decompressed high dynamic range values by interpolating between the first decompressed endpoint and the second decompressed endpoint using a set of weights, wherein each weight corresponds to a possible index value; and select one of the plurality of decompressed high dynamic range values in the palette for each channel of each pixel in the fixed size block using a decompressed index for the pixel.

17. The system of claim 11, further comprising a texture filter unit that is coupled to the pixel value computation unit and configured to interpret the decompressed high dynamic range values for each channel of each pixel as values represented in a floating point format or a fixed point format.

* * * * *